US012087136B2

(12) United States Patent
Pennington

(10) Patent No.: US 12,087,136 B2
(45) **Date of Patent: *Sep. 10, 2024**

(54) SYSTEMS AND METHODS FOR COMMUNITY SLOT-STYLE GAMING

(71) Applicant: RSPenn, LLC, Reno, NV (US)

(72) Inventor: David Peter Pennington, Alexandria (AU)

(73) Assignee: RSPenn LLC, Reno, NV (US)

( * ) Notice: Subject to any disclaimer, the term of this patent is extended or adjusted under 35 U.S.C. 154(b) by 442 days.

This patent is subject to a terminal disclaimer.

(21) Appl. No.: 17/469,781

(22) Filed: Sep. 8, 2021

(65) Prior Publication Data

US 2021/0407256 A1 Dec. 30, 2021

Related U.S. Application Data

(63) Continuation of application No. 16/917,486, filed on Jun. 30, 2020, now Pat. No. 11,138,837.

(60) Provisional application No. 62/869,109, filed on Jul. 1, 2019.

(51) Int. Cl.
*G07F 17/32* (2006.01)

(52) U.S. Cl.
CPC ...... *G07F 17/3276* (2013.01); *G07F 17/3213* (2013.01); *G07F 17/322* (2013.01); *G07F 17/3288* (2013.01)

(58) Field of Classification Search
CPC ............. G07F 17/3276; G07F 17/3213; G07F 17/322; G07F 17/3288
See application file for complete search history.

(56) References Cited

U.S. PATENT DOCUMENTS

| | | | |
|---|---|---|---|
| 7,192,347 | B1 | 3/2007 | Marks et al. |
| 7,306,514 | B2 | 12/2007 | Amaitis et al. |
| 7,654,898 | B2 | 2/2010 | Vancura |
| 7,780,170 | B2 | 8/2010 | Wong et al. |
| 8,079,903 | B2 | 12/2011 | Nicely et al. |
| 8,221,206 | B2 | 7/2012 | Marks et al. |
| 8,272,935 | B2 | 9/2012 | Anderson et al. |
| 8,360,861 | B2 | 1/2013 | McKay et al. |
| 8,613,650 | B2 | 12/2013 | Kovacs et al. |
| 8,702,491 | B2 | 4/2014 | Nguyen et al. |
| 9,177,447 | B2 | 11/2015 | Zoltewicz et al. |
| 9,202,345 | B2 | 12/2015 | Zoltewicz et al. |
| 9,286,765 | B2 | 3/2016 | Saunders et al. |
| 9,430,900 | B2 | 8/2016 | Zoltewicz et al. |
| 9,460,586 | B2 | 10/2016 | Montenegro |

(Continued)

OTHER PUBLICATIONS

Arche, "Examining the Physiological and Subjective Effects of Near-misses in Smartphone Games" vol. 33, issue 2; Journal of Gambling Studies; 2017.

(Continued)

*Primary Examiner* — James S. McClellan
*Assistant Examiner* — Ross A Williams
(74) *Attorney, Agent, or Firm* — RowanTree Law Group, PLLC; Carson C. K. . Fincham

(57) ABSTRACT

Systems, methods, and articles of manufacture provide for community video slot-style gaming such as slot-style games that include a community gaming field and that permit individual players or groups of players to initiate gameplay based on selections of one or more subsets of the community gaming field.

19 Claims, 12 Drawing Sheets

(56) References Cited

U.S. PATENT DOCUMENTS

| | | | |
|---|---|---|---|
| 9,472,054 | B2 | 10/2016 | Caputo et al. |
| 9,495,826 | B2 | 11/2016 | Nicely et al. |
| 9,542,799 | B2 | 1/2017 | Washington et al. |
| 9,564,006 | B2 | 2/2017 | Ryan |
| 9,685,030 | B2 | 6/2017 | Nguyen |
| 9,734,656 | B2 | 8/2017 | Fong |
| 9,852,574 | B2 | 12/2017 | Zoltewicz et al. |
| 9,852,579 | B2 | 12/2017 | Caputo et al. |
| 9,905,080 | B2 | 2/2018 | Lafky et al. |
| 9,905,083 | B2 | 2/2018 | Caputo et al. |
| 9,916,726 | B2 | 3/2018 | Pires |
| 9,953,482 | B2 | 4/2018 | Montenegro et al. |
| 10,068,415 | B2 | 9/2018 | Humphrey et al. |
| 10,102,711 | B2 | 10/2018 | Zoltewicz et al. |
| 10,115,273 | B2 | 10/2018 | Uss et al. |
| 10,147,271 | B2 | 12/2018 | Chim |
| 10,157,520 | B2 | 12/2018 | Marston |
| 10,198,894 | B2 | 2/2019 | Byng |
| 10,198,909 | B2 | 2/2019 | Marks |
| 2011/0319173 | A1* | 12/2011 | Backer ................ A63F 13/2145 463/42 |
| 2013/0084965 | A1 | 4/2013 | Gura et al. |
| 2014/0228098 | A1 | 8/2014 | Englman et al. |
| 2015/0356818 | A1 | 12/2015 | Rajaraman et al. |
| 2016/0210815 | A1 | 7/2016 | Holt et al. |
| 2018/0330576 | A1 | 11/2018 | Foley et al. |

OTHER PUBLICATIONS

Gainsbury, “A taxonomy of gambling and casino games via social media and online technologies” vol. 14, 2014—Issue 2; Feb. 24, 2014.

Preinterview First Office Action for U.S. Appl. No. 16/917,486 dated Nov. 30, 2020; 3 pps.

Notice of Allowance for U.S. Appl. No. 16/917,486 dated Jun. 9, 2021; 8 pps.

International Preliminary Report on Patentablity for PCT/US20/040354 issued Jan. 13, 2022; 6 pps.

* cited by examiner

SYSTEMS AND METHODS FOR COMMUNITY SLOT-STYLE GAMING

CROSS-REFERENCE TO RELATED APPLICATIONS

The present application claims benefit and priority to, and is a Continuation of U.S. patent application Ser. No. 16/917,486 filed on Jun. 30, 2020 and titled "SYSTEMS AND METHODS FOR COMMUNITY SLOT-STYLE GAMING", and which issued as U.S. Pat. No. 11,138,837 on Oct. 5, 2021, and which itself claims benefit and priority to, and is a Non-provisional of, U.S. Provisional Patent Application No. 62/869,109 filed on Jul. 1, 2019 and titled "SYSTEMS AND METHODS FOR COMMUNITY SLOT-STYLE GAMING", the entirety of each of which is hereby incorporated by reference herein.

BACKGROUND

While demand for wagering games continues to grow, the newest generation of tech-savvy wagering game players demand ever more interesting and detailed games. As such, some traditional gaming styles struggle to compete with the latest gaming offerings. Slot-style games, for example, offer the advantages of simple mechanics and predictable payback to operators, but are often simply not able to maintain adequate levels of engagement with younger gaming players. Finally, the most successful wagering games are associated with above average wagering amounts per session. Accordingly, wagering games that provide players with multiple options or "ways to win" have a much higher rate of success and are more engaging.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
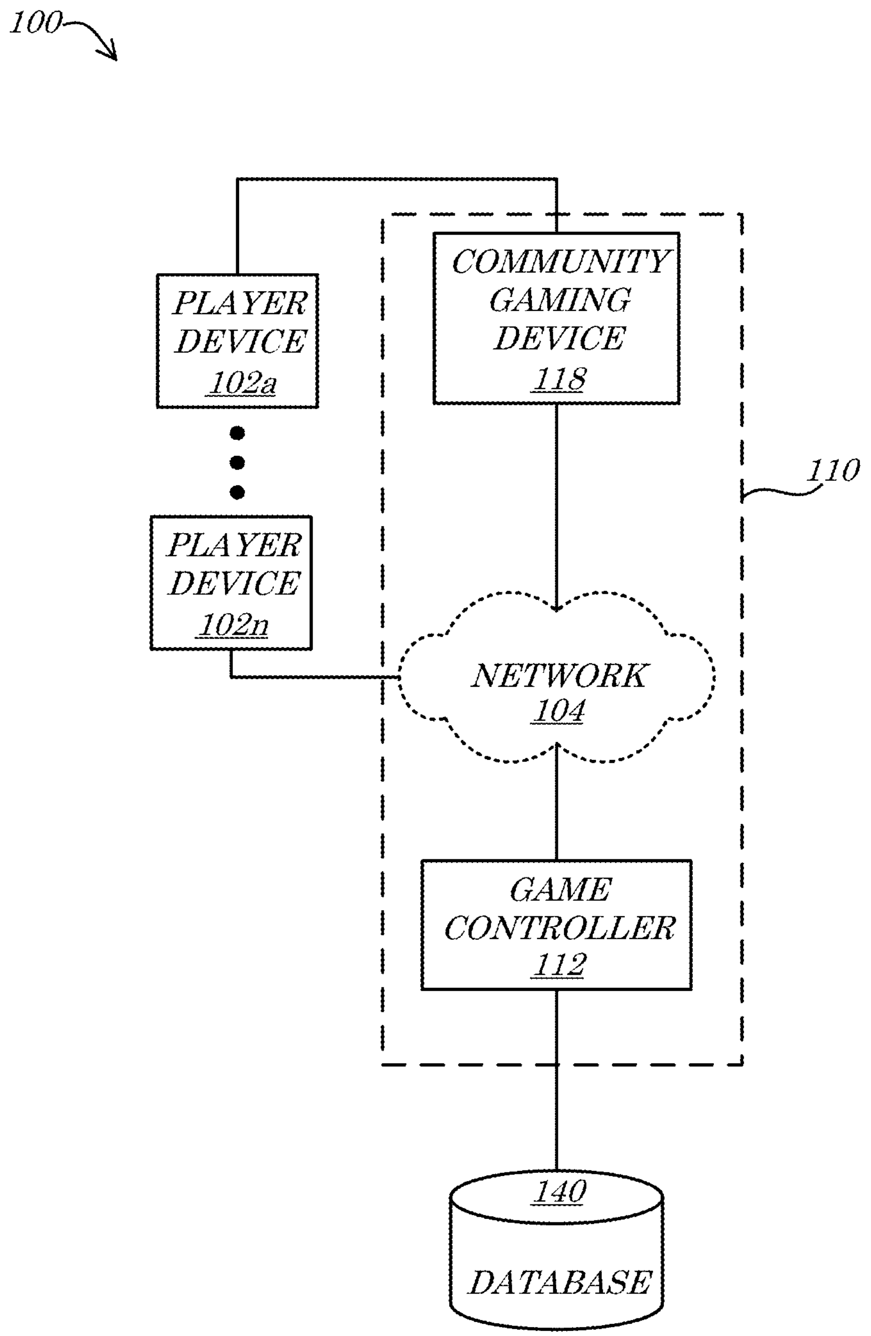
FIG. 1 is a block diagram of a system according to some embodiments.

Embodiments described herein are generally descriptive of systems, methods, apparatus, and articles of manufacture for communal or community slot-style gaming. In accordance with some embodiments, players of a community slot-style game may be presented with a community gaming or wagering field such as via a large video display device disposed to be viewable by all participating players The players may then, according to some embodiments, utilize available input mechanisms (e.g., a touch-screen interfacing with the community wagering field display, integrated personal player station devices, and/or wireless player devices) to select one or more subsets of the community wagering field to define various wagering portions (e.g., individual or group player wagering fields) thereof and/or may commit one or more wagering amounts to the one or more player wagering fields. According to some embodiments, individual player wagering strategies may be cooperative with each other to define or alter the outcome and/or results of a wagering event. In some embodiments, a physical (e.g., individual or communal) gaming element or token may be interactive with the communal display (and/or other system components) to initiate, affect, and/or end a round of communal slot-style gaming play.

According to some embodiments, various systems, methods, and articles of manufacture described herein provide for novel electronic game play functionality that is not readily reproduced in a non-computerized environment. It may not be possible (or practicable), for example, to provide for a mechanical and/or non-computerized communal gaming system that is capable of conducting a slot-style game in accordance with the embodiments presented herein. In some embodiments, such as in the case that a physical communal gaming element is utilized in game play, the interaction of the physical element with the computerized system for the slot-style game may not be possible (or practicable) to reproduce in the absence of the computerized environment. Accordingly, embodiments herein are believed to comprise improvements to the computerized systems by enabling computerized and/or electronic slot-style gaming systems to provide novel gaming features to complete with previous games by introducing aspects that were not previously known or practicable.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

A "game", as the term is utilized herein (unless otherwise specified), may generally comprise any game (e.g., wagering or non-wagering, skill-based, chance-based, scripted) playable by hand (e.g., utilizing non-electric physical components, boards, and/or pieces), and/or electronically playable, (e.g., via an electronic gaming device and/or over a network) playable by one or more players in accordance with specified rules. An electronic game may be playable on a Personal Computer (PC), online in web browsers, on a game console, on a dedicated and/or stand-alone gaming machine, and/or on a mobile device such as a smart-phone or tablet computer. "Gaming" thus generally refers to play of a game (e.g., by one or more players).

A "slot-style game", as the term is utilized herein (unless otherwise specified), generally refers to a game comprising one or more physical and/or virtual (e.g., simulated) slot reels and/or positions. While physical and/or simulated reels may "spin" or cycle through a plurality of possible outcomes before landing or stopping on specific symbols representing an outcome of an instance of the game, other electronic slot-style games may comprise an array and/or matrix of outcome positions that are filled or populated with symbols representing an outcome of the instance of the game (e.g., typically referred to as "cascading" or "tumbling reel" slots). Slot reel outcomes may be populated randomly or pseudo-randomly or may be predetermined (and/or determined based on a predetermined and/or desired result) and made to appear random. Slot-style games are typically games of chance and may comprise "wagering games".

A "wagering game", as the term is utilized herein (unless otherwise specified), may generally comprise a game in which a player can risk a wager or other consideration, such as, but not limited to: slot-style games, poker games, black-jack, baccarat, craps, roulette, lottery, bingo, keno, casino war, etc. A wager may comprise a monetary wager in the form of an amount of currency or any other tangible or intangible article having some value which may be risked on an outcome of a wagering game. The placement or selection of a wager in connection with video slot-style games is typically comprised of the designation of both (i) an amount or number of credits wagered per payline and (ii) a number of paylines to be wagered upon, the combination of which determines the total wager amount (e.g. the designation of two credit per pay line along with the designation of fifty pay lines combines for a total wager amount of 100 credits. "Gambling" or "wagering" generally refers to play of a wagering game.

The term "game provider", as utilized herein (unless otherwise specified), generally refers to an entity or system of components which provides games for play and facilitates play of such game by use of local and/or dedicated hardware devices and/or a network such as the Internet or a proprietary or closed network (e.g., an intranet or local or wide area network). For example, a game provider may operate a website which provides games in a digital format over the Internet and/or may operate a licensed wagering establishment in which dedicated wagering machines are located. In some embodiments in which a game comprising a wagering game is provided, a game provider may operate a gambling location at which wagers are accepted and results (e.g., winnings) of wagering games are provided.

As utilized herein, the term "player" may generally refer to any type, quantity, and or manner of entity associated with the play of a game such as a wagering game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online or networked game room, session, server, and/or other particular instance and/or segmentation of an online and/or local game.

The term player strategy or player wagering strategy may include one or more of player: selections, elected options, decisions, actions, inputs or the like that are or appear to be under the control of the player, involve player interaction, and/or executed by the player to optimize the outcome or entertainment value of the game. Player strategies herein include but are not limited to: the selection of a wager or wager amount, the placement or positioning of a payer field, the selection of a symbol, the selection of the size or shape of a player field. As used herein, the word(s) "positioning" and "selecting the position of" may be used interchangeably.

Some embodiments described herein are associated with a "player device" or a "network device". As utilized herein, a "player device" is a subset of a "network device". The "network device", for example, may generally refer to any device that can communicate via a network, while the "player device" may comprise a network device that is owned and/or operated by or otherwise associated with a player (e.g., a network device specifically configured to permit use thereof by the player, such as by receiving login credentials from the player). Examples of player and/or network devices may include, but are not limited to: a PC, a kiosk, a computer workstation, a mobile or wired tablet, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components. In some embodiments, a player device may comprise an electronic device configured to initiate, conduct, facilitate, and/or otherwise permit player participation in an electronic game.

As utilized herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As utilized herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As utilized herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as utilized herein (unless otherwise specified), may generally refer to any indicia and/or other information indicative of or associated with a subject, item, entity, and/or other object and/or idea. As utilized herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is utilized herein (unless otherwise specified), may generally comprise a period of time spanning a plurality of event instances (e.g., with respect to a communication and/or game session) or turns (e.g., rounds) of a game, the session having a defined start and defined end. An event instance or turn is triggered upon an initiation of, or request for, at least one result of the game by a player, players, or attendant, such as an actuation of a "start" or "spin" mechanism, or by a lapse of a predetermined amount of time, which initiation causes an outcome to be determined or generated (e.g., an RNG is contacted or communicated with to identify, generate or determine a random number to be used to determine an outcome for the event instance).

As utilized herein, the terms "outcome" and "result" should be differentiated in the present description in that an "outcome" is generally a representation of a "result", typically comprising one or more game elements or game symbols, or video animations. For example, in a "fruit themed" slot-style game, a winning outcome (i.e., an outcome corresponding to some kind of award, prize or payout) may comprise a combination of three "cherry" symbols. The "result" associated with this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible. Outcomes and results may have a one to one or one to many relationship. Accordingly, in some cases (herein) where an word "outcome" is specified, the word "result" could be substituted or added and produce the same or meaningful effect, (e.g., where an RNG selects a number in a database, that number may be related to both an outcome and a result and both are determined by the same action). Likewise, in other cases (herein) where an word "result" is specified, the word "outcome" could be substituted or added and produce the same or meaningful effect, (e.g., where an RNG selects a number in a database, that number may be related to both an outcome and a result and both are determined by the same action).

As utilized herein, the term "virtual currency" may generally refer to an in-game currency that may be utilized as part of a game or one or more games provided by a game provider as (i) currency for making wagers, and/or (ii) to purchase or access various in-game items, features or powers (e.g., "freemium" upgrades and/or options) and/or be convertible by the player into other forms of currency, awards, or prizes.

A "credit balance", as the term is utilized herein (unless otherwise specified), may generally refer to (i) a balance of currency, whether virtual currency and/or real currency, usable for making wagers and/or purchases in a game and/or (ii) another tracking mechanism for tracking a players success or advancement in a game by deducting there from points or value for unsuccessful attempts at advancement and adding thereto points or value for successful attempts at advancement, and/or (iii) a balance that may be redeemed for other forms of currency, awards, or prizes.

Some embodiments are descriptive of an "array" or "matrix" of symbols or game outcomes. As utilized herein, the terms "array" and "matrix" generally refer to a group of symbols, numbers, and/or expressions arranged in a plurality of rows and columns (or that can be readily and appropriately represented mathematically as being so arranged). In some embodiments, the term "array" is utilized to refer to a multi-dimensional matrix or combination of matrices while the term "matrix" is utilized to refer to a two-dimensional set of symbols or numbers (e.g., slot reel symbols and/or mathematical representations thereof). According to some embodiments, such as in the case that an array and/or matrix is populated with graphical game symbols and/or player avatar representations, the array or matrix may be output and/or displayed (e.g., transmit to and/or rendered on a community/communal gaming device and/or a player device) as part of a game session. In some embodiments, such a matrix, array, and/or multiples or combinations thereof may comprise a gaming or wagering "field". According to some embodiments, a gaming or wagering "field" may comprise multiple arrays and/or matrices logically connected or coupled together to form various non-rectilinear shapes.

III. Community Slot-Style Gaming Systems

Referring now to FIG. 1, a block diagram of an example system 100 according to some embodiments is shown. The system 100 may comprise, for example, a plurality of player devices 102*a-n* in communication, e.g., via a network 104, with a game server 110 (e.g., which itself may comprise one or more of the network 104, a game controller 112, and/or a community gaming device 118). For simplicity of description only, any or all of the player devices 102*a-n* are referred to herein as a player device 102, even though the plurality of player devices 102*a-n* may include different quantities and/or types of player devices (as described herein). The game server 110 may be operable to communicate with and/or access a database 140 (which may comprise one or more databases and/or tables and which may comprise a storage device distinct from (or be a component of) the game server 110). The database 140 may, for example, store rules enabling community/communal slot-style game play that may be employed by the game server 110 such that a plurality of players associated with the various player device 102*a-n* may play a game utilizing a community gaming field (e.g., in a manner that is not practicable or possible in an off-line, mechanical, and/or non-computerized system; not shown in FIG. 1). In some embodiments, the database 140 may be stored on or by the game server 110 while in other embodiments the database 140 may be stored on or by another computing device with which the game server 110 is operable to communicate in order to at least access the data in the database 140 (e.g., another server device remote from the game server 110, operable to determine outcomes for an event instance of a game; not explicitly shown). In other embodiments multiple databases 140 may be stored on or by multiple computing devices. In some embodiments a processor (e.g., one or more microprocessors, one or more microcontrollers, one or more digital signal processors; not separately shown) of a player device 102*a-n* and/or the game server 110 (and/or the game controller 112) may receive instructions (e.g., from a memory or like device; e.g., the database 140), and execute those instructions, thereby performing one or more processes defined by those instructions. Instructions may be embodied in, e.g., one or more computer programs and/or one or more scripts or codes.

In some embodiments the game server 110 and/or one or more of the player devices 102*a-n* stores and/or has access to data useful for facilitating play of a game. In one or more embodiments, stored data and instructions may enable and/or cause community slot-style game play. For example, the game server 110 and/or a player device 102*a-n* may store (i) one or more probability databases (e.g., the database 140) for determining one or more potential slot-style game outcome(s) for a given event instance, (ii) a current state or status of a game or game session (e.g., time until next automated game play initiation, spin, roll, etc.), (iii) one or more user interfaces and/or user interface components for use in a game, (iv) one or more game themes for a game, (v) communications protocols for communicating with and/or interpreting physical communal game element positioning and/or attributes, and/or (vi) profiles or other personal information associated with players of a game. It should be noted that in some embodiments such data may be (a) stored on the game server 110 and information based on such data may be output to a player device(s) 102*a-n* during play of a game while (b) in other embodiments a game program may be downloaded to a local memory of a player device 102*a-n* and/or the community gaming device 118 and thus such data may be stored on a player device 102*a-n* and/or the community gaming device 118 (e.g., in encrypted or other secure or tamper-resistant form). In some embodiments, both of (a) and (b) may be utilized.

According to some embodiments, the game server 110 may generally comprise a computing device for facilitating play of a game (e.g., by receiving an input from a player, determining an outcome for a game, causing an outcome of a game to be displayed, determining a win result encompassing a plurality of spins or other game events, facilitating a wager, and/or a provision of a payout for a game). In some embodiments, the game server 110 may comprise a standalone and/or dedicated gaming or wagering machine and/or device in direct and/or local communication with a first player device 102*a*, such as a wagering machine and/or device located in a wagering establishment. In such embodiments, the first player device 102*a* may comprise a portion or component of the game server/machine 110 such as a player screen, keyboard, and/or other player input mechanism. According to some embodiments, another player device 102*n* may be in communication with the game server 110 via the network 104 such as via a local/short-range Bluetooth® connection. In such "local" embodiments, the game server/machine 110 may comprise a logical processing portion embodied by the game controller 112 and an input, output, or display portion as embodied by the community gaming device 118.

In some embodiments, the game server 110 may comprise geographically dispersed components such as in the case that the community gaming device 118 comprises a "local" player-facing machine and/or component in an establishment where the player devices 102*a-n* are located and the game controller 112 is centrally or remotely disposed (e.g., such as in the case that a single game controller 112 is coupled to control/manage a plurality of community gaming devices 118 at a given location, or is disposed at a different location altogether). According to some embodiments, the game controller 112 may be in communication with the community gaming device 118 via the network 104 that may comprise, for example, the Internet. In some embodiments, the game server 110 and/or the components 104, 112, 118 thereof may be operated by a game provider or another entity (not shown).

According to some embodiments, the game server 110 may enable community slot-style game play that may manage player input received from the player devices 102*a-n* and receive one or more game outcomes from another remote server (not shown) operable to provide such outcomes. In some embodiments, the game server 110 (and/or the community gaming device 118 and/or the game controller 112) may be operable to execute and/or facilitate a community slot-style game program for community play of a slot-style game. In accordance with some embodiments, in addition to administering or facilitating play of a game, the game server 110 may comprise one or more computing devices responsible for handling online processes such as, but not limited to: serving a website comprising one or more games to a player device 102*a-n* and/or processing transactions (e.g., wagers, deposits into financial accounts, managing accounts, controlling games, etc.). In some embodiments, the game server 110 may comprise two or more server computers operated by the same entity (e.g., one server being primarily for storing states of games in progress and another server being primarily for storing mechanisms for determining outcomes of games, such as a Random Number Generator (RNG)).

In accordance with some embodiments, the player devices 102*a-n* may comprise any type and/or quantity of computing devices that are operable to execute and/or facilitate the execution of a community slot-style game program such as by being in communication with the game server 110, the community gaming device 118, and/or the game controller 112. For example, a player device 102*a-n* may comprise a component of the game server 110, a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Playstation™, and/or Nintendo™ Wii™), and/or handheld or portable video game devices (e.g., Nintendo™ Game Boy™ or Nintendo™ DS™). A player device 102*a-n* may comprise and/or interface with various components such as input and output devices (not separately depicted) and, in some embodiments, game server 110. A player device 102*a-n* may be a component of a dedicated gaming device (e.g., a slot machine; such as the game server 110 or the community gaming device 118) or a non-dedicated gaming device (e.g., an iPad™). In some embodiments, the game server 110 may be in communication with a variety of different types of player devices 102*a-n*. According to some embodiments, a player device 102*a-n* may comprise a physical communal gaming element that may be utilized by more than one player or attendant. At least one of the player devices 102*a-n* may comprise, for example, an electronic token, fob, figurine, dice, and/or other object that is communicatively coupled to the community gaming device 118. In some embodiments described herein, such a player device 102*a-n* may selectively affect game play based on a determination of a physical location of the player device 102*a-n* with respect to one or more other gaming components (such as other player devices 102*a-n* and/or the community gaming device 118 and/or a portion or component thereof).

According to some embodiments, a player device 102*a-n* may be utilized to play a wagering or non-wagering slot-style game over the network 104 and output information relating to the game to players participating in the game (e.g., outcomes for an event instance of the game, qualifying for a bonus round of the game, outcomes determined for a bet, a win result of a bet, credit balance of credits available for play of the game, etc.). Any and all information relevant to any of the aforementioned functions may be stored or determined locally on one or more of the player devices 102*a-n* and/or may be accessed utilizing one or more of the player devices 102*a-n* (in some embodiments such information being stored on, or provided via, the game server 110 and/or the database 140). In some embodiments, a player device 102*a-n* may store some or all of the program instructions for determining, for example, (i) that an event instance or game instance (e.g., a specific spin of a slot-style game) has been triggered or initiated (and, in some embodiments, communicating such a trigger or initiation to game server 110), (ii) a win result for a bet (e.g., which may be dependent on (or associated with) a plurality of outcomes), (iii) identifying and/or selecting subsets of gaming fields, arrays, or matrices (e.g., to play and/or wager on), and/or (iv) modifying a game interface to reflect events within the game. In some embodiments, the game server 110 may be operable to authorize the one or more player devices 102*a-n* to access such information and/or program instructions remotely via the network 104 and/or download from the game server 110 (e.g., directly or via an intermediary server such as a web server) some or all of the program code for executing one or more of the various functions described herein. In some embodiments, outcome and/or result determinations may be carried out by the game server 110 and/or the game controller 112 thereof (or another server with which the game server 110 communicates) and the player devices 102*a-n* may be terminals for displaying to an associated player such outcomes and results and other graphics and data related to a game.

According to some embodiments, a player device 102*a-n* may temporarily become dissociated from ongoing communal play, during which time such player device is utilized to temporarily and independently facilitate the gameplay of a slot-style game feature over the network 104 (e.g. while operating independently of other player devices 102-*b-n* a first player device 102-*a* may facilitate the operation of a bonus event or feature event awarded only to one (e.g., a first) player, during which time community play continues for all other players who do not qualify for such bonus or feature).

According to some embodiments, a player may utilize a separate physical device (e.g., an RFID enabled player chip or communal object such as a dice) that is electronically or otherwise associated with an individual player or player device 102*a-n* (and/or may comprise a player device 102*a-n*) to indicate a player selection, including the selection of a wager amount or player field. Upon placement of such a physical/communal player device 102*a-n*, including the placement on the community gaming device 118, the physical/communal player device 102*a-n* may indicate one or more player wager strategies (e.g. the placement of a red (RFID enabled) chip placed in the upper left corner of the community gaming field may indicate a wager amount of one dollar ($1.00) and the selection of the upper left corner as the selected player field for that session). According to some embodiments, placement of the physical/communal player device 102*a-n* on a specific portion or area of the community gaming field may affect game play for (i) the individual player, (ii) a group of players (e.g., on the same team and/or having a common attribute), and/or (iii) all players of the game.

In some embodiments, the one or more player devices 102*a-n* may each be located at the same location as at least one other player device 102*a-n* (e.g., such as in a casino or internet café) or remote from all other player devices 102*a-n*. Similarly, any given player device 102*a-n* may be located at the same location as the game server 110, community gaming device 118, and/or game controller 112 or may be remote from the game server 110, community gaming device 118, and/or game controller 112. In some embodiments, while the game server 110 may be useful or used by any of the player devices 102*a-n* to perform certain functions described herein, the game server 110 need not control any of the player devices 102*a-n*. For example, in some embodiments the game server 110 may comprise a server hosting a website of an online casino accessed by one or more of the player devices 102*a-n*.

In some embodiments, the game server 110 (or remote portions thereof, such as a remote version of the game controller 112) may not be necessary or desirable. For example, some embodiments described herein may be practiced on one or more player devices 102*a-n* without a central authority (e.g., locally via the community gaming device 118 and/or via the player devices 102*a-n*). In such embodiments, any functions described herein as performed by the game server 110 and/or data described as stored on or by the game server 110 may instead be performed by or stored on one or more player devices 102*a-n* and/or the community gaming device 118. Additional manners of distributing information and program instructions among one or more player devices 102*a-n*, the game server 110 and/or other network devices may be utilized in some embodiments.

Figure 2:
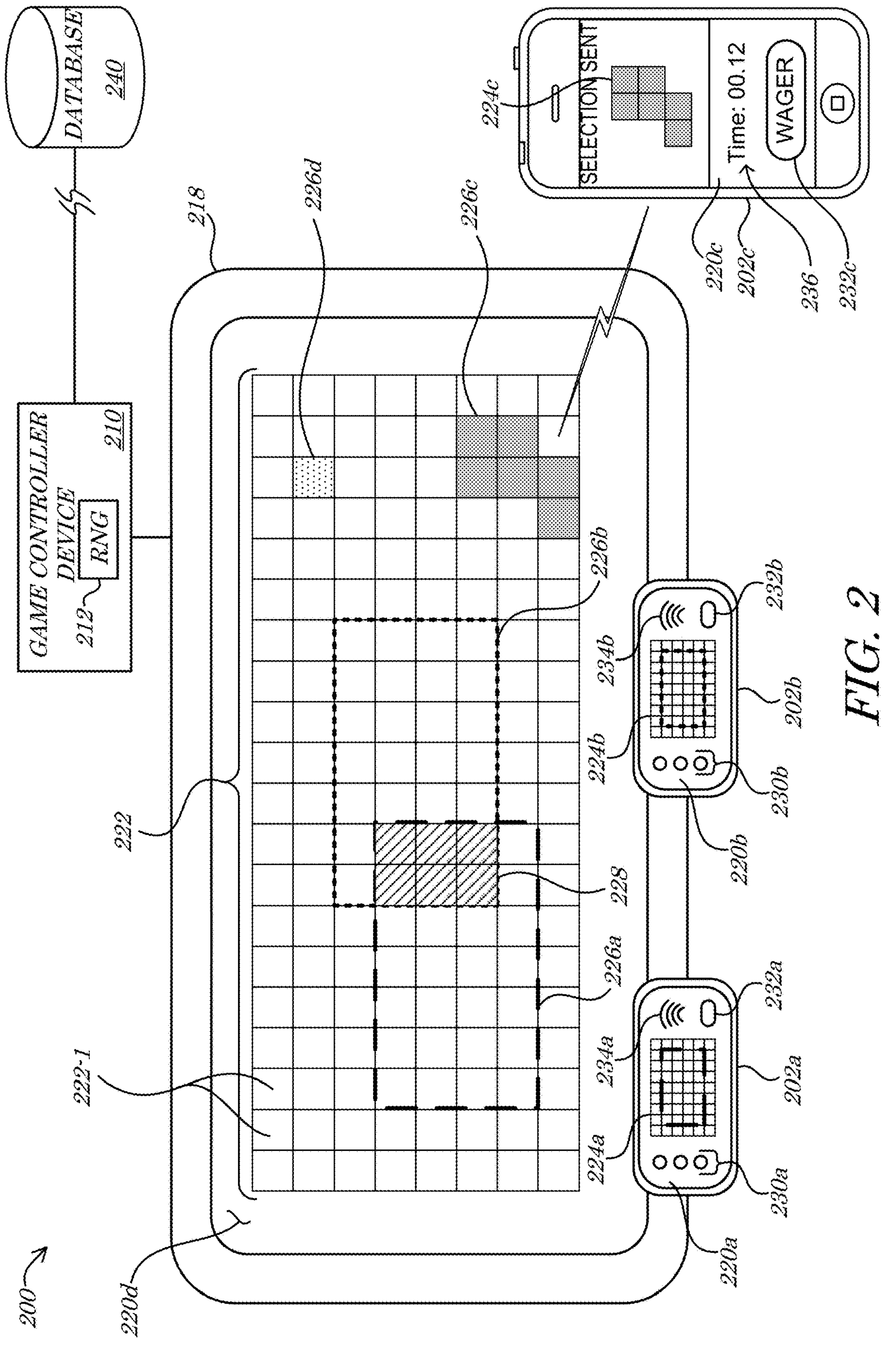
FIG. 2 is a block diagram of a system according to some embodiments.

Turning to FIG. 2, a block diagram of a system 200 according to some embodiments is shown. In accordance with some embodiments, the system 200 may comprise a plurality of player devices 202*a-c*, a game controller device 210 (e.g., comprising an RNG 212), and/or a community gaming device 218. In some embodiments, the system 200 may comprise and/or the various devices 202*a-c*, 210, 212, 218 may output various interfaces 220*a-d*. As depicted in FIG. 2, for example, a first player device 202*a* may output a first interface 220*a*, a second player device 202*b* may output a second interface 220*b*, a third player device 202*c* may output a third interface 220*c*, and/or the community gaming device 218 (e.g., a video display screen) may output a community gaming interface 220*d*. According to some embodiments, the community gaming interface 220*d* may be utilized to output a community gaming field 222, depicted for convenience only as a rectilinear matrix or array of individual gaming positions 222-1. The community gaming field 222 may generally comprise any style, configuration, and/or quantity of individual gaming positions 222-1 as is or becomes desirable or practicable. According to some embodiments, the user devices 202*a-c* in conjunction with the game controller device 210 may conduct (in whole or in part), facilitate, and/or otherwise be associated with execution of one or more stored procedures, applications, processes, and/or methods (e.g., the method 300 of FIG. 3 herein, and/or one or more portions thereof) as described herein.

In some embodiments, one or more of the player devices 202*a-c* (and/or the interfaces 220*a-c* thereof) may output representations of the community gaming field 222 or portions 224*a-c* of (e.g., less than the entirety of) the community gaming field 222 (i.e., sub-portions of the available individual gaming positions 222-1). According to some embodiments, individual players (or groups of players; e.g., teams) may utilize the payer devices 202*a-c* and/or the representations of the community gaming field 222 and/or the portions 224*a-c* thereof to identify, select, and/or define one or more gameplay strategies. The player devices 202*a-c* may be utilized, for example, to define player fields 226*a-d*. In some embodiments, the player fields 226*a-d* may comprise various subsets of the individual gaming positions 222-1. The player devices 202*a-c* may be utilized, for example, to navigate around the community gaming field 222 to select and/or define the player fields 226*a-d*. As depicted with respect to the first and second player devices 202*a-b*, for example, first and second player fields 226*a-b* may comprise two (2) different rectilinear subsets of individual gaming positions 222-1 (e.g., rectilinear subsets or portions of the community gaming field 222). In some embodiments, such as depicted with respect to the third player device 202*c* for example, a third player field 226*c* may comprise a non-rectilinear (e.g., freeform shape or grouping) subset of the individual gaming positions 222-1 (e.g., a non-rectilinear subset or portion of the community gaming field 222). In some embodiments, player fields 226*a-c* may generally comprise any type, configuration, and/or quantity of player-selected and/or identified individual gaming positions 222-1. A fourth player field 226*d* may, for example, comprise a single individual gaming position 222-1 or may comprise a portion of a player field 226*a-d* that comprises an individual gaming position 222-1 that is not graphically (and/or mathematically) positioned adjacent to one or more other individual gaming positions 222-1 comprising the particular player field 226*a-d* (the fourth player field 226*d* may be selected, for example, in a manner similar to gaming number selection in the game of Keno). In some embodiments, one or more minimum requirements or rules may govern selection and/or definition of the player fields 226*a-d*. In the case of the fourth player field 226*d*, for example, additional individual gaming positions 222-1 may need to be selected or defined in association with a relative position of the fourth player field 226*d* to define a minimum matrix or grouping of individual gaming positions 222-1 such as a minimum player field size of four (4) individual gaming positions 222-1 (e.g., whether adjacent or not). According to some embodiments, representations of the player fields 226*a-d* may be output via the community gaming interface 220*d* such that all participating players (and/or spectators) may readily view which portions of the community gaming field 222 have been selected and/or wagered on (e.g., a different color, symbol, avatar, etc., may be utilized to denote different players). In some embodiments, players may select the player fields 226*a-d* by utilizing input mechanisms of the respective player devices 202*a-c* to select one or more individual gaming positions 222-1 of the player field 226*a-d*, such as by selecting a top-left corner of a rectilinear shape, selecting each individual gaming position 222-1 that is desired, dragging a cursor and/or utilizing directional keys or buttons to size and/or shape a selection window, and/or by entering or selecting an identifier of one or more individual gaming positions 222-1 (e.g., a row and column number of a particular matrix or shape).

According to some embodiments, player gameplay strategies may comprise (i) a selection, identification, positioning, and/or definition of one or more of the player fields 226*a-d* and/or (ii) a selection, identification, and/or definition of one or more quantitative gameplay positions (e.g., risk and/or wager amounts/options). In some embodiments, player gameplay strategies and/or game outcomes and/or game results may be based on relations between two or more player fields 226*a-d*. As depicted for exemplary purposes only in FIG. 2, for example, the first player field 226*a* and the second player field 226*b* may define an area of overlap or a joint player field 228 (e.g., an identification of individual gaming positions 222-1 that are shared by or common to each of the first player field 226*a* and the second player field 226*b*) on or in the community gaming field 222. In some embodiments, such as in the case that the first and/or second player devices 202*a-b* are utilized to define not only a shape and/or size (and/or other geometric configuration) of the respective first and second player fields 226*a-b* but positing of the first and second player fields within the community gaming field 222 as well, the joint player field 228 may be defined by the first and second player devices 202*a-b*. According to some embodiments, the first player field 226*a* may be selected by player input (e.g., from a first player, not shown) received by the first player device 202*a* (such as from a listing of available field sizes, shapes, etc.; not shown) but the location of the first player field 226*a* on or in the community gaming field 222 may be fixed, predetermined, and/or selected on behalf of the player (e.g., by the game controller device 210 and/or utilizing the RNG 212). According to some embodiments, any aspect or characteristic of the first player field 226*a* may be automatically determined or defined, e.g., on the player's behalf. The first player device 202*a* may be utilized, for example, to select one of a plurality of available avatars or characters to utilize to play the slot-style game, and the first player field 226*a* may be defined by the avatar/character selection. Each available avatar/character may be assigned, for example, a first player field 226*a* that is positioned at a different location within (and/or have a different size and/or shape within) the community gaming field 222. In some embodiments, the second player field 226*b* may be defined entirely by input received by the second player device 202*b*. A second player (not shown) may, for example, define the shape (i.e., rectangle), size (i.e., dimensions), and/or position (i.e., on or in the community gaming field 222) of the second player field 226*b*. In some embodiments, the size and/or shape of the second player field 226*b* (and/or other player fields 226*a*, 226*c-d*) may be associated with a particular and/or predefined wager size. In such a manner, for example, selection of a size/shape of a player field 226*a-d* may automatically determine a wager amount. According to some embodiments, the position of the second player field 226*b* may be defined to overlap with the first player field 226*a* to define the joint player field 228.

In some embodiments, the various player fields 226*a-d* may be defined by the various player devices 202*a-c* such as one or more integrated and/or coupled (e.g., dockable or integrated with the game controller device 210) player devices 202*a-b* and/or a wirelessly coupled player device 202*c* (e.g., in communication via a local and/or short range network and/or communication protocol). According to some embodiments, one or more data inputs such as a definition of the fourth player field 226*d* may be received by the game controller 210 in response to a transmission from a remote device (not shown) in communication therewith (e.g., an Internet-connected player device; not explicitly depicted). In some embodiments, the various player devices 202*a-c* may comprise input mechanisms that facilitate gameplay input such as selections or definitions of player fields 226*a-d* (and/or selection or definitions of wager amounts, etc.). The player devices 202*a-c* and/or respective interfaces 220*a-c* may comprise, for example, selection buttons 230*a-b*, action or wager buttons 232*a-c*, and/or player account readers 234*a-b*. In some embodiments, the selection buttons 230*a-b* may be utilized to position and/or select or define the respective player fields 226*a-b* and/or may be utilized to select or define wager amounts or other gameplay parameters. According to some embodiments, the wager buttons 232*a-c* may be utilized to commit a selected and/or defined wager amount (or otherwise initiate or lock-in a gameplay strategy; e.g., with respect to an associated player field 226*a-d*). In some embodiments, the player account readers 234*a-b* may comprise RFID, optical, magnetic stripe, and/or other input devices operable to detect, read, and/or input player identification and/or account information such as a unique player tracking number. According to some embodiments, the player devices 202*a-c* may output various data such as a game status and/or state to the players. As depicted with respect to the third player device 202*c*, for example, a wager event timer 236 may be provided that displays an amount of time remaining to place a wager (or otherwise commit a gameplay strategy) before a next instance of an automated spin or other determinative action of the slot-style game (e.g., a next automatic population of the individual gaming position 222-1 of the community gaming field 222).

According to some embodiments, the game controller device 210 may utilize player inputs such as player gameplay strategies (e.g., player fields 226*a-d* and/or quantitative gameplay positions) and stored data, rules, and/or thresholds to evaluate one or more outcomes of the slot-style game. Each player field 226*a-d* and associated quantitative gameplay position (e.g., a bet or wager in the case of a wagering game) may be evaluated based on random (or pseudo random) gameplay data populated (e.g., generated by the RNG 212) in each relevant individual gaming position 222-1 of the community gaming field 222, for example, to calculate or compute a gameplay outcome. In some embodiments, the game play outcomes may be evaluated based on one or more paytables, probabilities, etc. to derive a result of the slot-style game. According to some embodiments, any or all of the player input, gameplay rules, logic, and/or thresholds, and/or one or more paytables may be stored in a database 240. In the example depicted in FIG. 2, for example, the game controller 210 may utilize the RNG 212 to generate a random game symbol, value, etc. (not shown) for each of the individual gaming positions 222-1 of the community gaming field 222 and may evaluate the first player field 226*a* based on the subset of such game symbols/values that fall within the first player field 226*a*. In some embodiments, the RNG 212 may be utilized to populate only those individual gaming positions 222-1 corresponding to active or defined player fields 226*a-d* and any remaining individual gaming positions 222-1 of the community gaming field 222 may be populated with symbols that are not determinative or related to gameplay (or may remain unpopulated). According to some embodiments, the joint player field 228 may be separately evaluated (e.g., to compute/calculate a secondary outcome or bonus outcome) and/or may be taken into account when evaluating the first and/or second player fields 226*a-b*. In such a manner, for example, overlap (or commonality) in gameplay strategies such as an overlap in the first and second player fields 226*a-b* may alter gameplay outcomes and/or results as compared to a straight evaluation of each of the first and second player fields 226*a-b* separately/individually. In some embodiments, such overlap may be leveraged by players to implement group and/or team strategies. Players may coordinate efforts, for example, to cause and/or define the joint player field 228 such that each participating player associated with the joint player field 228 may earn a bonus, additional wagering revenue, more points, etc.

In some embodiments, the system 200 may comprise a pattern, score, or trend board (not shown) such as is typically utilized in Baccarat games. According to some embodiments, the trend board may display statistical and/or historic (e.g., past or previous) gaming metrics such as wins, losses, bets placed, wagers amounts placed, etc., for each portion, subset, and/or individual gaming positing 222-1 of the community gaming field 222. In some embodiments, a trend such as a measure of win history for each individual gaming positing 222-1 may be displayed with respect to and/or on the community gaming field 222 such as by assigning a particular respective color to each individual gaming positing 222-1 based on the history thereof, e.g., thereby creating a 'heat map' that is visible to the players of the game to utilize for selection and/or definition of the their respective player fields 226*a-d* (and/or locations thereof within the community gaming field 222). In some embodiments, the trends/data may be displayed with respect to gameplay results realized for a particular avatar or character. In such a manner, for example, a player may utilize the pattern board to select, identify, define, size, shape, and/or place/locate (e.g., within the community gaming field 222) a player field 226*a-d*. In the case that player fields 226*a-d* are tied to different avatars or characters, for example, the player may choose an avatar that the player believes will be the luckiest or most successful based on information displayed by the pattern board. Similarly, in some embodiments the player may choose different player fields 226*a-d* and/or individual gaming positions 222-1 based on data displayed by the pattern board with respect to such player fields 226*a-d* and/or individual gaming positions 222-1.

According to some embodiments, any or all of the components 202*a-c*, 210, 212, 220*a-d*, 222, 222-1, 224*a-c*, 226*a-d*, 228, 230*a-b*, 232*a-c*, 234*a-b*, 236, 240 of the system 200 may be similar in configuration and/or functionality to any similarly named and/or numbered components described herein. Fewer or more components 202*a-c*, 210, 212, 220*a-d*, 222, 222-1, 224*a-c*, 226*a-d*, 228, 230*a-b*, 232*a-c*, 234*a-b*, 236, 240 (and/or portions thereof) and/or various configurations of the components 202*a-c*, 210, 212,

220*a-d*, 222, 222-1, 224*a-c*, 226*a-d*, 228, 230*a-b*, 232*a-c*, 234*a-b*, 236, 240 may be included in the system 200 without deviating from the scope of embodiments described herein. While multiple instances of some components 202*a-c*, 220*a-d*, 222-1, 224*a-c*, 226*a-d*, 230*a-b*, 232*a-c*, 234*a-b* are depicted and while single instances of other components 210, 212, 222, 228, 236, 240 are depicted, for example, any component 202*a-c*, 210, 212, 220*a-d*, 222, 222-1, 224*a-c*, 226*a-d*, 228, 230*a-b*, 232*a-c*, 234*a-b*, 236, 240 depicted in the system 200 may comprise a single device, a combination of devices and/or components 202*a-c*, 210, 212, 220*a-d*, 222, 222-1, 224*a-c*, 226*a-d*, 228, 230*a-b*, 232*a-c*, 234*a-b*, 236, 240, and/or a plurality of devices, as is or becomes desirable and/or practicable. Similarly, in some embodiments, one or more of the various components 202*a-c*, 210, 212, 220*a-d*, 222, 222-1, 224*a-c*, 226*a-d*, 228, 230*a-b*, 232*a-c*, 234*a-b*, 236, 240 may not be needed and/or desired in the system 200.

IV. Community Slot-Style Gaming Processes

Figure 3:
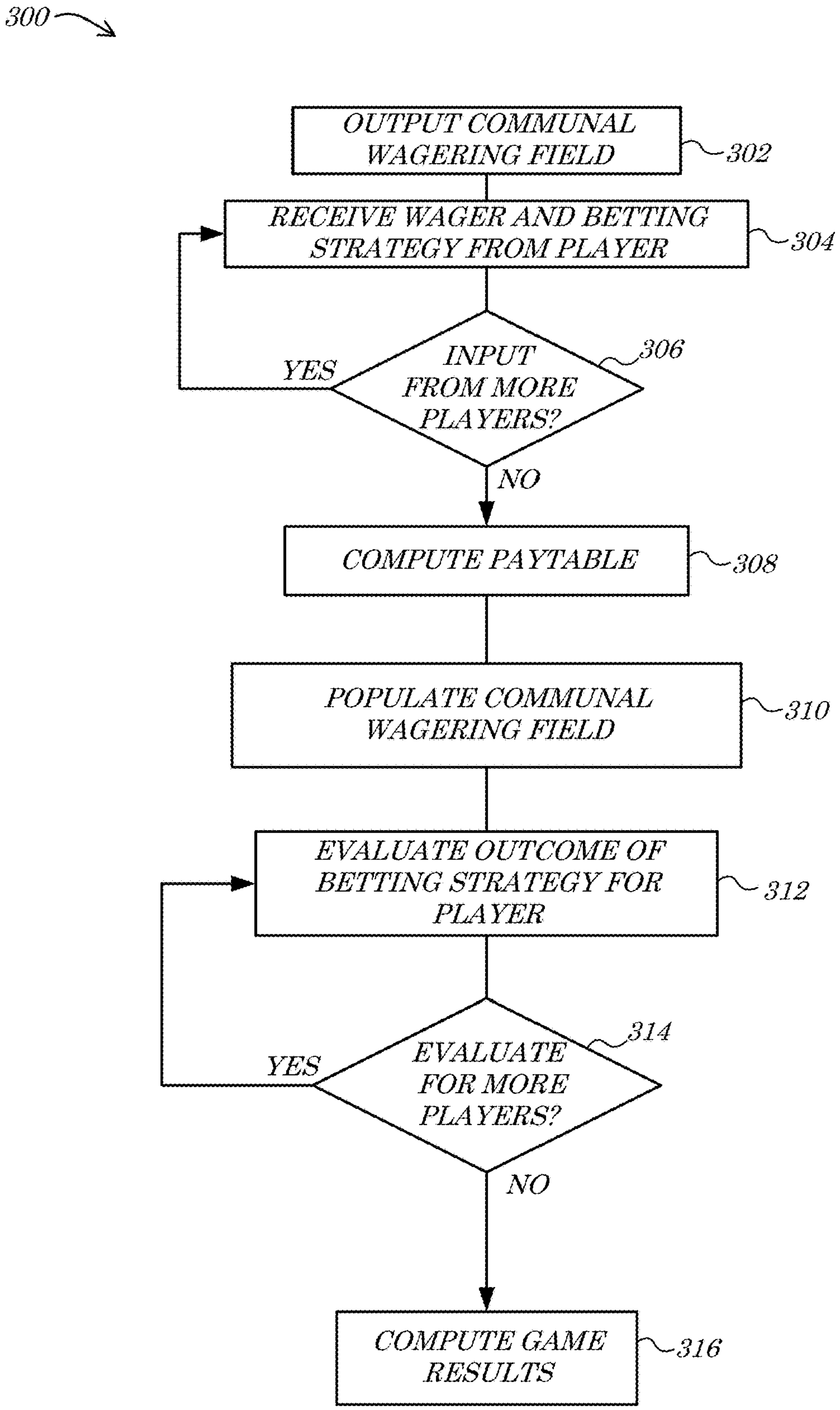
FIG. 3 is a flow diagram of a method according to some embodiments.

Referring now to FIG. 3, a flow diagram of a method 300 according to some embodiments is shown. In some embodiments, the method 300 may be performed and/or implemented by and/or otherwise associated with one or more specialized and/or computerized processing devices (e.g., the player devices 102*a-n*, 202*a-c* and/or the servers, apparatus, and/or controller devices 110, 118, 210, 212 of FIG. 1 and/or FIG. 2 herein), specialized computers, computer terminals, personal or mobile devices, tablets, computer servers, kiosks, LCD or LED touch-screens, computer systems and/or networks, and/or any combinations thereof (e.g., by one or more local game providers and/or local gaming player processing devices). In some embodiments, the method 300 may be embodied in, facilitated by, and/or otherwise associated with various input mechanisms and/or interfaces (such as the example interfaces 220*a-d*, 420, 520*a-e*, 620 of FIG. 2, FIG. 4, FIG. 5A, FIG. 5B, FIG. 5C, FIG. 5D, FIG. 5E, and/or FIG. 6 herein).

The process and/or flow diagrams described herein do not necessarily imply a fixed order to any depicted actions, steps, and/or procedures, and embodiments may generally be performed in any order, including simultaneously, that is practicable unless otherwise and specifically noted. In some embodiments, although a fixed order is not generally implied, the various components, steps, or procedures of a given method as disclosed herein may be specifically implemented in the order depicted and/or procedures, steps, or components shown following another procedure, step, or component may be performed and/or triggered in response to one or more previously-depicted and/or connected procedures, steps, or components. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein. While the method 300 is described with respect to a wagering game and attendant wagering strategies and gameplay fields, it should be understood that in some embodiments the described slot-style game may not involve or contemplate wagering activities (e.g., a non-wagering game).

According to some embodiments, the method 300 may comprise outputting (e.g., by a processing device of a game controller and/or community slot-style gaming device, and/or via an output device and/or electronic communications network device) a community wagering field, at 302. A slot-style game interface (e.g., the community gaming interfaces 220*d*, 420, 520*a-e* of FIG. 2, FIG. 4, FIG. 5A, FIG. 5B, FIG. 5C, FIG. 5D, and/or FIG. 5E, herein) may, for example, be output or caused to be output by a game controller and/or server. In some embodiments, the community wagering field may be output via a community display screen such as a video display screen embodied in a stand-alone or dedicated gaming table. The gaming table may, for example, comprise a horizontal and/or flat surface display screen that outputs graphical indications of each of a plurality of individual gaming positions and/or their respective gaming symbols, colors, icons, avatars, values, etc. (e.g., descriptive of output for game play and/or output for trend and/or non-game play information). According to some embodiments, subsets and/or portions of the community wagering field may be provided and/or output, such as via one or more peripheral and/or player devices in communication with the game controller. In the case of a dedicated community slot-style gaming table, for example, a housing or structure of the table may be coupled to support and/or retain one or more integrated player input and/or output devices such as player touchscreens. In other embodiments the community display screen may be vertically displayed with player stations 102*a-n* in front or around the screen (e.g. theater style configuration).

In some embodiments, the method 300 may comprise receiving (e.g., by the processing device, player input devices, and/or via the electronic communications network device), a player wagering strategy (e.g., player input), at 304. An indication may be received from a player device and/or via a network, for example, such indication being descriptive of a desire of a particular player (e.g., identified by a particular player identifier and/or associated (e.g., uniquely) with a particular player account) to place a wager in or for an instance or session of play of a community slot-style game. In some embodiments, the indication may be received upon and/or in response to an activation of or interfacing with, by the player, an interface component provided (e.g., at 302) with respect to the community wagering field. Activation of the component by the player may, for example, cause a signal to be transmitted from an integrated or mobile electronic player device utilized by the player, such signal being addressed and/or directed to the processing device (e.g., a gaming controller and/or communications port thereof). According to some embodiments, the signal may comprise an indication and/or definition of a wager amount, a player identifier (e.g., player account number, IP address, MAC address, etc.), a time stamp, and/or information identifying, selecting, and/or defining one or more player fields that comprise a subset of the community wagering field. In some embodiments, the indication/input may be received via manipulation of a physical communal gaming element by the player. The player may, for example, provide and/or define input by tossing an RFID and/or electronic die onto the community display screen, with e.g., one or more particular gaming positions associated with the toss comprising player input.

According to some embodiments, the method 300 may comprise determining (e.g., by the processing device) whether there is more input from additional players to be received, at 306. In the case that a certain number of player devices and/or players have initiated gameplay, such as by providing login credentials, taking a turn manipulating a physical communal gaming element, and/or activating a player input device (or software application thereof) for example, a count of player wagering strategies may be tallied to determine whether the current number of wagering strategies received remains less than the total count of participating players. In the case that a number of player wagering strategies have not yet been received, locked-in, and/or defined, the method 300 may proceed back to 304 to receive (or listen or wait for) additional player input. In the case that all wagering strategies for participating players have been received, the method 300 may proceed to compute (e.g., by selecting from a database by the processing device) a paytable, at 308. One or more mathematical formulas and/or models may be utilized, for example, to calculate a probability distribution based on a player wagering strategy and a fixed payback percentage (e.g., in accordance with applicable wagering regulations, permits, and/or filings). In the case that a player defines a custom player field comprising a certain subset of individual gaming positions of the community wagering field and/or defines an applicable wager amount, for example, the number and/or positioning of the selected individual gaming positions may be utilized to derive a matrix or table of payouts or results that correspond to possible gameplay outcomes. In some embodiments, the paytable may be pre-computed and may be determined or computed by identifying an applicable pre-calculated table from a listing of available paytables. According to some embodiments, different paytables may be determined, looked-up, computed, and/or calculated for each of a plurality of players having provided different wagering strategies.

In some embodiments, the method 300 may comprise populating (e.g., by the processing device) the community wagering field (or a portion thereof), at 310. The processing device may communicate with, control, and/or comprise, for example, an RNG utilized to generate random (or pseudo-random) numbers that are mapped to various slot-style outcomes, symbols, results and/or values. According to some embodiments, the RNG may be activated to generate one or more symbols, outcomes, results, values, icons, avatars, and/or other gaming elements for each individual gaming position of the community gaming field. In some embodiments, only those individual gaming positions corresponding to defined player fields may be populated and/or any remaining individual gaming positions may be populated with symbols, etc., that do not affect gameplay. In some embodiments, non-gameplay symbols may be selected and/or generated to populate the remaining individual gaming positions (i.e., those not selected by players) to appear as if they were generated using the RNG (e.g., the same set of available symbols that are utilized for the game may be utilized to populate the remaining individual gaming positions). According to some embodiments, population of the community wagering field, subsets or portions thereof, and/or defined player fields, may occur in a relational manner. In the case of a player field comprising a three by five (3×5) matrix of individual gaming positions, for example, each of the five (5) columns may function as a virtual "slot reel" such that the symbols/values populating the "reel" are chained together or related in a linear fashion. According to some embodiments, the matrix, array, and/or field may comprise many more symbol positions such as a field comprising twenty (20) rows and fifty (50) columns. In some embodiments, the RNG may be utilized to select predetermined outcomes from a database that populate the entire gaming field or a subset thereof, which outcomes selection may or may not involve an evaluation of the individual player fields previously selected. In some embodiments, gaming positions may be related in various manners such that symbols to be populated appear to be (or are) populated from various directions, gameplay borders (e.g., edges of the community wagering field), etc. According to some embodiments, the gaming positions may not be related—e.g., each gaming position may be independent of any or all other gaming positions. In some embodiments, the populating may occur at predefined and/or otherwise timed intervals or points in time. In such a manner, for example, each participating player may have a certain amount of time to lock-in a gaming strategy prior to an automatically occurring gameplay event.

According to some embodiments, the method 300 may comprise evaluating (e.g., by the processing device) an outcome of the betting strategy for a player, at 312. Stored rules, data, and/or logic may be accessed and/or initiated (e.g., by the processing device), for example, to operate on input variables (e.g., player field definitions and/or other strategy parameters) to compute or otherwise determine gameplay outcomes. In accordance with the population of the community wagering field at 310 as it corresponds to the individual gaming positions defined by the player field, for example, one or more outcomes may be identified. As is typical with standard slot-style games, for example, one or more paylines (predetermined game position relationship paths) may be evaluated to identify cooperative symbols/values that comprise a particular outcome. According to some embodiments, the evaluating may be based upon a specific or unique symbol assigned to or selected by a particular player such as a 'lucky' bonus symbol, the occurrence of which provides (or facilitates) a winning outcome for a subset of the players (e.g., for a particular player that has selected or purchased the special symbol or has acquired the symbol by manipulation of a physical communal gaming element such as an electronic die). In some embodiments, such as in the case that two or more player strategies are related in some manner in accordance with the community slot-style game rules (e.g., overlapping, coinciding, blocking, and/or joint gaming positions in the respective player fields), the evaluating may comprise identifying outcomes based on such overlapping positions and/or areas (e.g., a joint outcome). According to some embodiments, such joint/overlapping outcomes may be evaluated based on the same rule set as individual player outcomes or may be evaluated based on a different rule set such as a secondary or bonus game rule set. In some embodiments, certain outcomes such as occurrences of special symbols with a player's field may be associated with a competitive or cooperative outcome. According to some embodiments, one or more outcomes or results may be determined based on one or more outcomes of different players. In the case that a player betting strategy comprises a strategy based on another players strategy (or outcome or result), for example, the other players outcome may be determined and then the dependent player's outcome may be determined based thereon (e.g., mirrored, copied, magnified, etc.). According to some embodiments, evaluation of a joint player field may alter the behavior (e.g., evaluation) of the particular gaming position(s) thereof in one or more subsequent rounds of play.

In some embodiments, the method 300 may comprise determining (e.g., by the processing device) whether there are more outcomes for additional players that need to be evaluated, at 314. In the case that a certain number of player devices and/or players have provided wagering strategy input, for example, a count of player wagering strategies may be tallied to determine whether the current number of outcomes evaluated remains less than the total count of player wagering strategies. In the case that a number of player wagering strategies have not yet been evaluated, the method 300 may proceed back to 312 to evaluate additional player wagering strategies. In the case that all player wagering strategies have been evaluated, the method 300 may proceed to compute (e.g., by the processing device) game results, at 316. The processing device may evaluate, in some embodiments, any outcomes achieved by a player (and any applicable wagers) to calculate or lookup a payout, win, or loss amount for such player. In the case of joint, group, and/or team outcomes, any game result (e.g., points, credits, currency) may be divided amongst the joint, group, and/or team members, or each member may receive the result/payout amount. In some embodiments, cooperative or competitive results stemming from cooperative or competitive outcomes may be awarded. A competitive result may comprise, for example, a player winning an amount tied to one or more other player's wager and/or winnings, e.g., based on an occurrence of a competitive outcome for the player. In such a manner, for example, players may win or lose points, credits, and/or funds directly between other players (as opposed to from the "house" or gaming entity).

According to some embodiments, awards may be distributed in addition to or in place of those tied to the outcomes. In the case that a special community or group symbol appears in the community wagering field and/or in one or more player fields (and/or with respect to one or more physical communal game element manipulations), for example, every player (or every player on the same team or in a group) may be awarded a benefit (e.g., a bonus). In some embodiments, any awards or benefits conferred based on the outcomes or other triggers may comprise points, credits, currency, services, products, and/or gameplay enhancements. Gameplay enhancements may comprise, for example, an increased size of an available player field, improved paytables, access to different areas of the community wagering field, etc. In accordance with one example, a player that defines and wagers on a three by five (3×5) player field and achieves a winning outcome may be rewarded by an automatic increase in the player field to a five by seven (5×7) player field size, in that applicable round of play or in future rounds In some embodiments, such as in competitive play, a player that wins (or wins more) with respect to another player may have their player field increased in size while the other players player field may shrink (e.g., players may compete for individual symbol positions or total numbers of individual player positions that may be wagered upon). Similarly, a player win for a particular player field located at a particular spot in the community wagering field may be awarded upon a win condition by allowing the player to move the player field to a previously "locked" area of the community wagering field and/or may be permitted to define additional player fields (e.g., a multiplier of individual symbol positions that may be selected by the player). Similarly, by automatic determination of a computing device or otherwise a player field may be relocated to an alternate area within the community wagering field that has a more desirable outcome. According to some embodiments, any game results may be distributed and/or output. The community wagering field may be dynamically updated, for example, to indicate any outcomes and/or results, such as in different colors and/or utilizing different symbols for different players or groups of players. In some embodiments, the dynamic responsive updating of the community wagering field may not be possible without some or all of the various electronic and/or computerized components described herein. In the case that the community wagering field comprises a matrix of twenty-five by twenty-five (25×25), fifty by fifty (50×50), seventy-five by fifty (75×50), one hundred by one hundred (100×100), and/or other configurations that define individual gaming positions in excess of one hundred (100), for example, mechanical "reels" and/or offline/non-electronic means would not practicably be able to duplicate such functionality.

V. Community Slot-Style Gaming Interfaces

Figure 4:
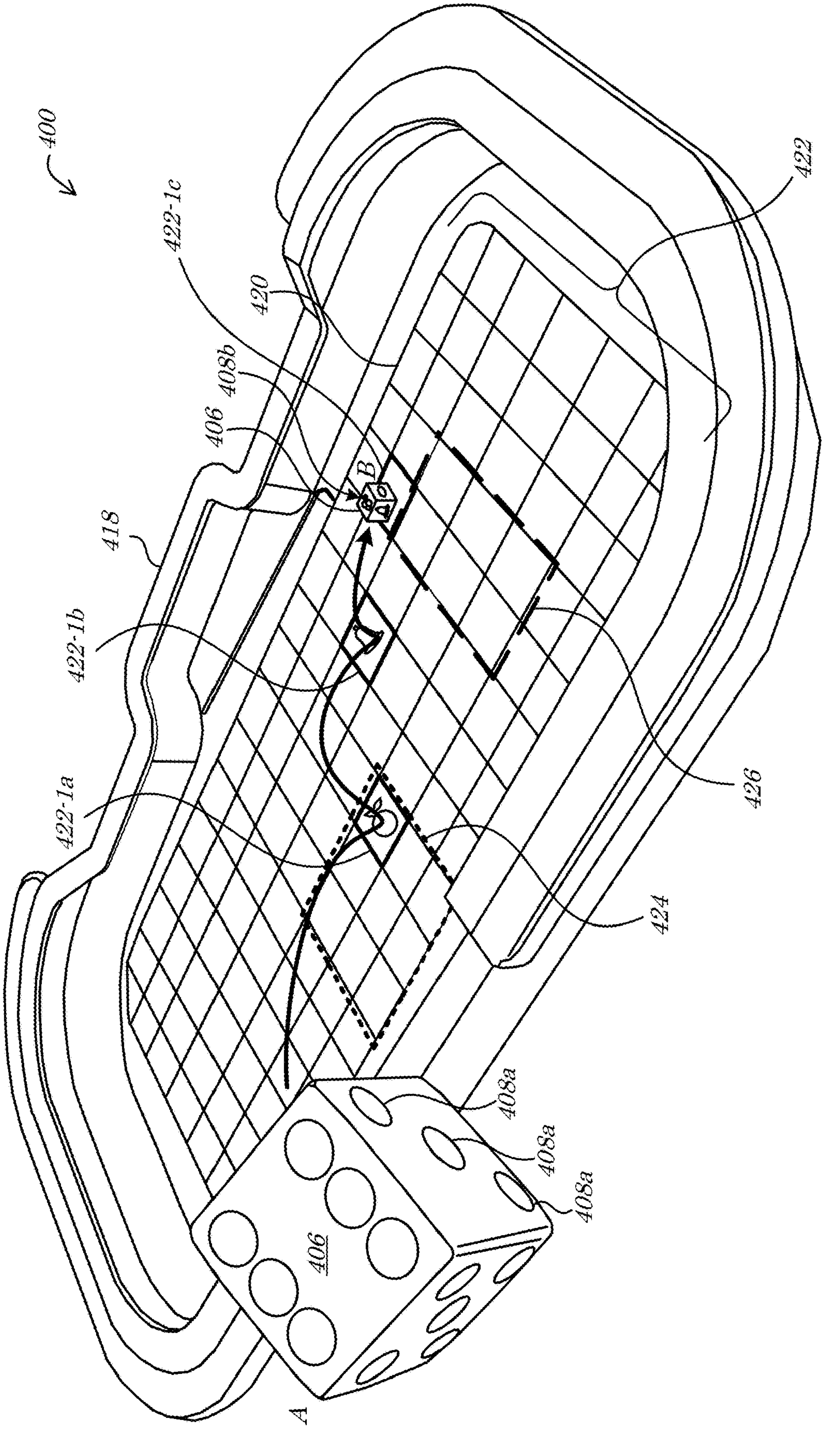
FIG. 4 perspective diagram of a system according to some embodiments.

Turning now to FIG. 4, a perspective diagram of a system 400 according to some embodiments is shown. In some embodiments, the system 400 may comprise a physical (individual or communal) gaming element such as the depicted die 406. While depicted as a die 406, in some embodiments the physical gaming element/die 406 may comprise one or more other objects such as chips, tokens, figurines (e.g., physical representations of characters and/or avatars), marbles, chits, placards, etc. According to some embodiments, the element/die 406 may comprise a physical object operable to be manipulated by a player or attendant (not shown) and may comprise one or more indicia 408*a-b*. The element/die 406 may comprise a non-electronic object (such as a standard die) with printed, engraved, emblazoned, adhered, and/or other affixed indicia 408*a-b*. The die 406 depicted in FIG. 4 at a first position "A" may, for example, comprise a standard die with first indicia 408*a* such as engraved dots representing a different value for each facet of the die 406. In some embodiments, the die 406 depicted in FIG. 4 at a second position "B" may comprise a standard die object with second indicia 408*b* such as painted-on icons representing a different game symbol for each facet of the die 406.

In some embodiments, the element/die 406 may comprise an electronic object such as an RFID, Wi-Fi®, Bluetooth® and/or other short-range communications protocol-enabled object. The element/die 406 may comprise, for example, an embedded processor, memory, power supply (e.g., battery), and/or communications device (none of which are shown in FIG. 4) that enable the element/die 406 to communicate with (e.g., provide input to) a community gaming device 418 such as the physical gaming table depicted in FIG. 4. According to some embodiments, the element/die 406 may comprise one or more output or display devices (e.g., one on each facet/side thereof; not separately labeled in FIG. 4) that output indications of (and/or defining) the indicia 408*a-b*. In some embodiments, the indicia 408*a-b* may be dynamically altered by the element/die 406 and/or by the community gaming device 418. At the first position "A" (e.g., at a first time), for example, the die 406 may output the first indicia 408*a* that represent standard six-sided (6*d*) dice numeric dot indicia. Upon a triggering event such as a tossing or rolling of the die 406 onto an electronic community gaming interface 420 of the community gaming device 418, in some embodiments, the die 406 may switch to outputting the second indicia 408*b*, such as the slot symbols depicted in FIG. 4 at the second position "B" (e.g., at a second time).

According to some embodiments, the indicia 408*a-b* and/or the positioning of the die 406 with respect to the community gaming interface 420 may provide and/or define input to the community gaming device 418 that affects game play of an electronic slot-style game provided by the community gaming device 418. The electronic community gaming interface 420 may, for example, comprise one or more output screens (e.g., touch-sensitive screens or surfaces) that display and/or define a community gaming field 422 comprised of a plurality (e.g., a matrix) of individual gaming positions 422-1*a*, 422-1*b*, 422-1*c*. In some embodiments, such as in the case that the die 406 is tossed or "cast" onto the community gaming device 418 (e.g., onto the community gaming field 422 output by the community gaming interface 420) it may first strike a first gaming position 422-1*a*, second strike a second gaming position 422-1*b*, and finally land or rest upon a third gaming position 422-1*c*. According to some embodiments, the die 406 in conjunction with the electronic community gaming interface 420 may conduct (in whole or in part), facilitate, and/or otherwise be associated with execution of one or more stored procedures, applications, processes, and/or methods (e.g., the method 300 of FIG. 3 herein, and/or one or more portions thereof) as described herein.

In some embodiments, the physical interaction of the die 406 with the community gaming device 418 (e.g., and/or the community gaming field 422 output by the community gaming interface 420 thereof) may affect the game play of the underlying slot-style game in one or more manners. According to some embodiments, the striking, landing, and/or touching of the die 406 to the individual gaming positions 422-1*a*, 422-1*b*, 422-1*c* may define and/or alter the population of game symbols and/or values with respect to the individual gaming positions 422-1*a*, 422-1*b*, 422-1*c*. The contact may be utilized by the community gaming device 418 to trigger population of the respective individual gaming positions 422-1*a*, 422-1*b*, 422-1*c* in a random manner, for example, or may cause the community gaming device 418 to populate the individual gaming positions 422-1*a*, 422-1*b*, 422-1*c* based on one or more of the indicia 408*a-b* of the die 406. In the case that an upward-facing surface of the die 406 comprises an indicia 408*a-b* of an "orange" symbol when it contacts the first gaming position 422-1*a*, for example, the community gaming device 418 may receive an indication of the indicia 408*a-b* from the die 406 and cause the community gaming interface 420 to populate the first gaming position 422-1*a* with an "orange" symbol (as depicted in FIG. 4). In some embodiments, such as in the case that an upward-facing surface of the die 406 comprises an indicia 408*a-b* of the number six (6) when it contacts the second gaming position 422-1*b*, the community gaming device 418 may receive an indication of the indicia 408*a-b* from the die 406 and cause the community gaming interface 420 to populate the second gaming position 422-1*b* with a "bell" symbol (as depicted in FIG. 4)—e.g., based on a computed table that corresponds the value of six (6) to the "bell" symbol.

According to some embodiments, one or more subsets of individual gaming positions 422-1*a*, 422-1*b*, 422-1*c* such as a first portion 424 of the community gaming field 422 may be identified and/or defined based on the physical interaction of the die 406 with the community gaming device 418 (e.g., and/or the community gaming field 422 output by the community gaming interface 420 thereof). In the case that the first strike of the die 406 on the community gaming interface 420 is identified (e.g., via electronic triangulation, communication, pressure sensitivity, capacitance sensing, etc.) at the first gaming position 422-1*a*, for example, the first portion 424 may be defined as a pre-set size and/or shaped grouping of individual gaming positions 422-1*a*, 422-1*b*, 422-1*c* that correspond to the identified first gaming position 422-1*a*. As depicted in FIG. 4, for example, the first gaming position 422-1*a* may be identified and/or defined as a particular corner of the rectangular-shaped first portion 424, thereby defining and/or positioning the first portion 424 on the community gaming field 422. In some embodiments, the first portion 424 may comprise a portion of the community gaming field 422 that is (or will be) populated based on the physical relation to the die 406. The first portion 424 may be populated, for example, based on an icon or symbol set, paytable, and/or other gaming parameter that is set and/or defined based on the die 406. According to some embodiments, the first portion 424 may comprise a bonus portion or area in which symbols are populated based on a more favorable paytable than the remainder of the community gaming field 422.

In some embodiments, the physical interaction of the die 406 may affect and/or define one or more player fields 426. A first player field 426 may be defined (e.g., in size and/or position) based on the landing of the die 406 at the third gaming position 422-1*c*, for example, and/or the first player field 426 may be populated based on the second indicia 408*b* within the third gaming position 422-1*c*. As depicted in FIG. 4, for example, the first player field 426 may be defined as being adjacent to (e.g., sharing a side of a gaming position with) the third gaming position 422-1*c*. According to some embodiments, the size, shape, and/or positioning of the first player field 426 may be defined by a receipt of the community gaming device 418 of an indication of the second indicia 406*b* (e.g., the "cherries" symbol), e.g., from the die 406. In some embodiments, the die 406 may be cast after the defining of the first player field 426 and the physical relation of the casting to the first player field 426 may alter or define game play for the first player field 426.

As depicted in FIG. 4 for example, the first player field 426 may be defined by a first player and the first portion 424 may comprise a player field defined by a second player. One of the players (or another player) may roll the die 406 onto the community gaming interface 420 and the first hit may be registered (e.g., sensed and/or recorded by the community gaming device 418) in the first gaming position 422-1*a* and the third hit/landing may be registered (e.g., sensed and/or recorded by the community gaming device 418) in the third gaming position 422-1*c*. Because the first gaming position 422-1*a* falls within the bounds of the first portion 424/second players field, in some embodiments, the second players field may be granted a bonus, multiplier, access to a different paytable, etc. Because the third gaming position 422-1*c* borders the first player field 426, the first player field 426 may be granted a different bonus, multiplier, access to a different paytable than the second player's field, etc. In such a manner, for example, the tossing of the die 406 may result in physical interactions that cause electronic changes to the play of the underlying slot-style game hosted by the community gaming device 418.

According to some embodiments, any or all of the components 406, 408*a-b*, 418, 420, 422, 422-1*a*, 422-1*b*, 422-1*c*, 424, 426 of the system 400 may be similar in configuration and/or functionality to any similarly named and/or numbered components described herein. Fewer or more components 406, 408*a-b*, 418, 420, 422, 422-1*a*, 422-1*b*, 422-1*c*, 424, 426 (and/or portions thereof) and/or various configurations of the components 406, 408*a-b*, 418, 420, 422, 422-1*a*, 422-1*b*, 422-1*c*, 424, 426 may be included in the system 400 without deviating from the scope of embodiments described herein. While multiple instances of some components 408*a-b*, 422-1*a*, 422-1*b*, 422-1*c* are depicted and while single instances of other components 406, 418, 420, 422, 424, 426 are depicted, for example, any component 406, 408*a-b*, 418, 420, 422, 422-1*a*, 422-1*b*, 422-1*c*, 424, 426 depicted in the system 400 may comprise a single device, a combination of devices and/or components 406,

408*a*-*b*, 418, 420, 422, 422-1*a*, 422-1*b*, 422-1*c*, 424, 426, and/or a plurality of devices, as is or becomes desirable and/or practicable. Similarly, in some embodiments, one or more of the various components 406, 408*a*-*b*, 418, 420, 422, 422-1*a*, 422-1*b*, 422-1*c*, 424, 426 may not be needed and/or desired in the system 400.

Referring now to FIG. 5A, FIG. 5B, FIG. 5C, FIG. 5D, and FIG. 5E, block diagrams of different configurations of a system 500 according to some embodiments are shown. The system 500 may comprise, for example, a player device 502 that is in communication with an electronic community gaming device 518 (e.g., part of, mounted to, in wireless communication with, etc.). According to some embodiments, the player 502 may output a first interface 520*a* and/or the community gaming device 518 may output a second (and/or communal) interface 520*b*. The communal interface 520*b* may, for example, define and/or display a community gaming field 522 that comprises an electronic gaming matrix for a slot-style game. In some embodiments, the first interface 520*a* may output a mirrored image and/or representation of the community gaming field 522 via the player device 502. According to some embodiments, the player device 502 in conjunction with the electronic community gaming device 518 may conduct (in whole or in part), facilitate, and/or otherwise be associated with execution of one or more stored procedures, applications, processes, and/or methods (e.g., the method 300 of FIG. 3 herein, and/or one or more portions thereof) as described herein.

Figure 5A:
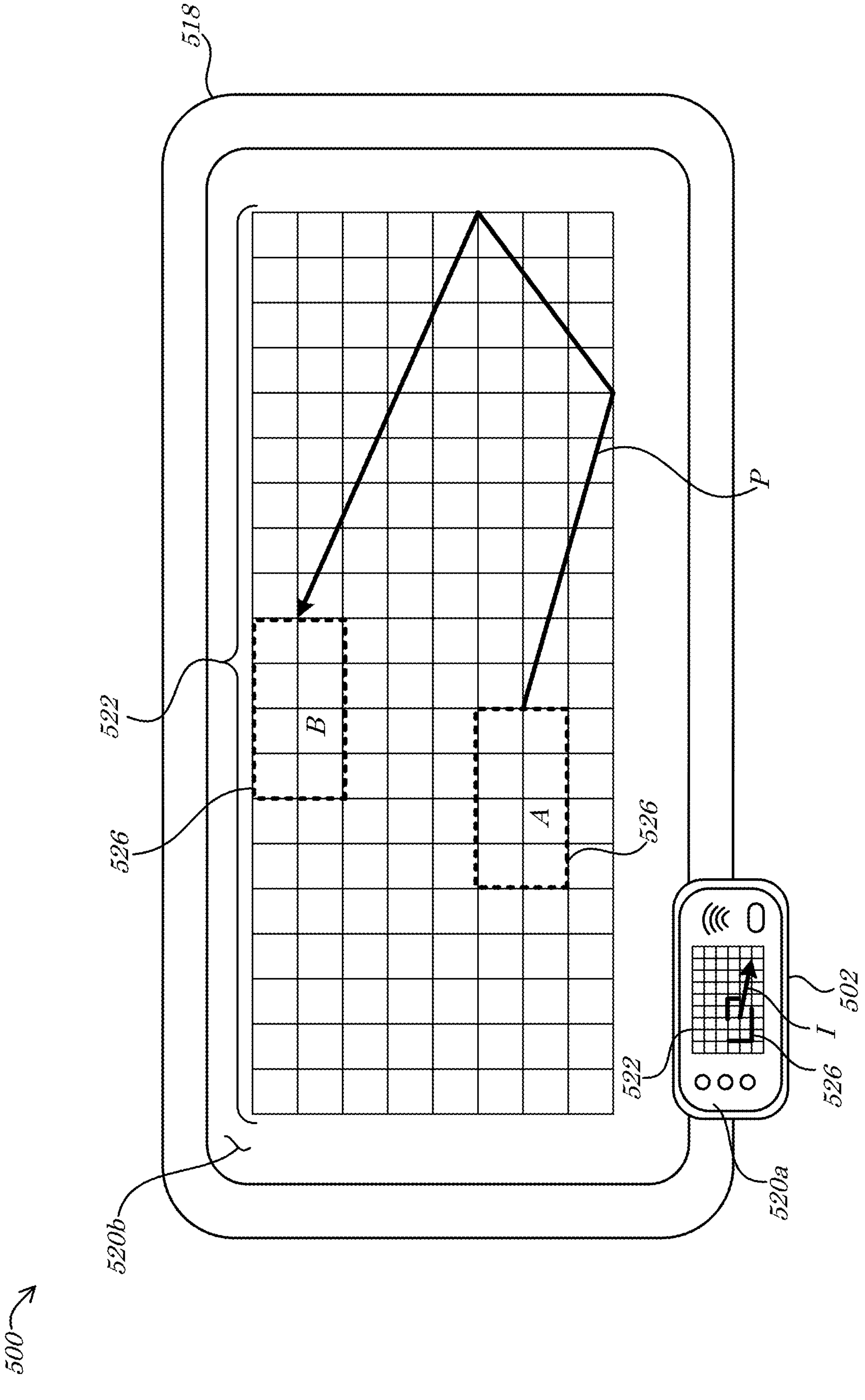
FIG. 5A, FIG. 5B, FIG. 5C, FIG. 5D, and FIG. 5E are block diagrams of different configurations of a system according to some embodiments.

In some embodiments, and with particular reference to FIG. 5A, the player device 502 may be utilized to define and/or position a player field 562. The player field 526 may comprise a subset of the community gaming field 522 defined at least in part by the player (not shown) operating the player device 502, for example, such as the two by four (2×4) rectangle depicted for purposes of non-limiting example in FIG. 5A. According to some embodiments, the player may position the player field 526 by providing input into a motion or physics model executed by the electronic community gaming device 518. The player may provide a "swipe" or motion-vector input via the first interface 520*a* as indicated by the vector "I", for example, which input may be provided by the player device 502 to the electronic community gaming device 518. According to some embodiments, the electronic community gaming device 518 may identify, receive, and/or accept the input "I" and utilize the input to resolve movement and/or a final position for the player field 526. As depicted in FIG. 5A, for example, the vector input "I" may be utilized to move the player field 526 from a first position "A", along a path "P", to a final position "B". As depicted, the path "P" may be defined based on stored rules and/or mathematical models utilized to simulate motion of the player field 526 as a simulated physical rectangular box that is operable to bounce or deflect off of the edges of the community gaming field 522. In other words, the input "I" may comprise both directional and speed or force components that are each utilized by execution of a pre-stored model to position (or reposition) the player field 526.

Figure 5B:
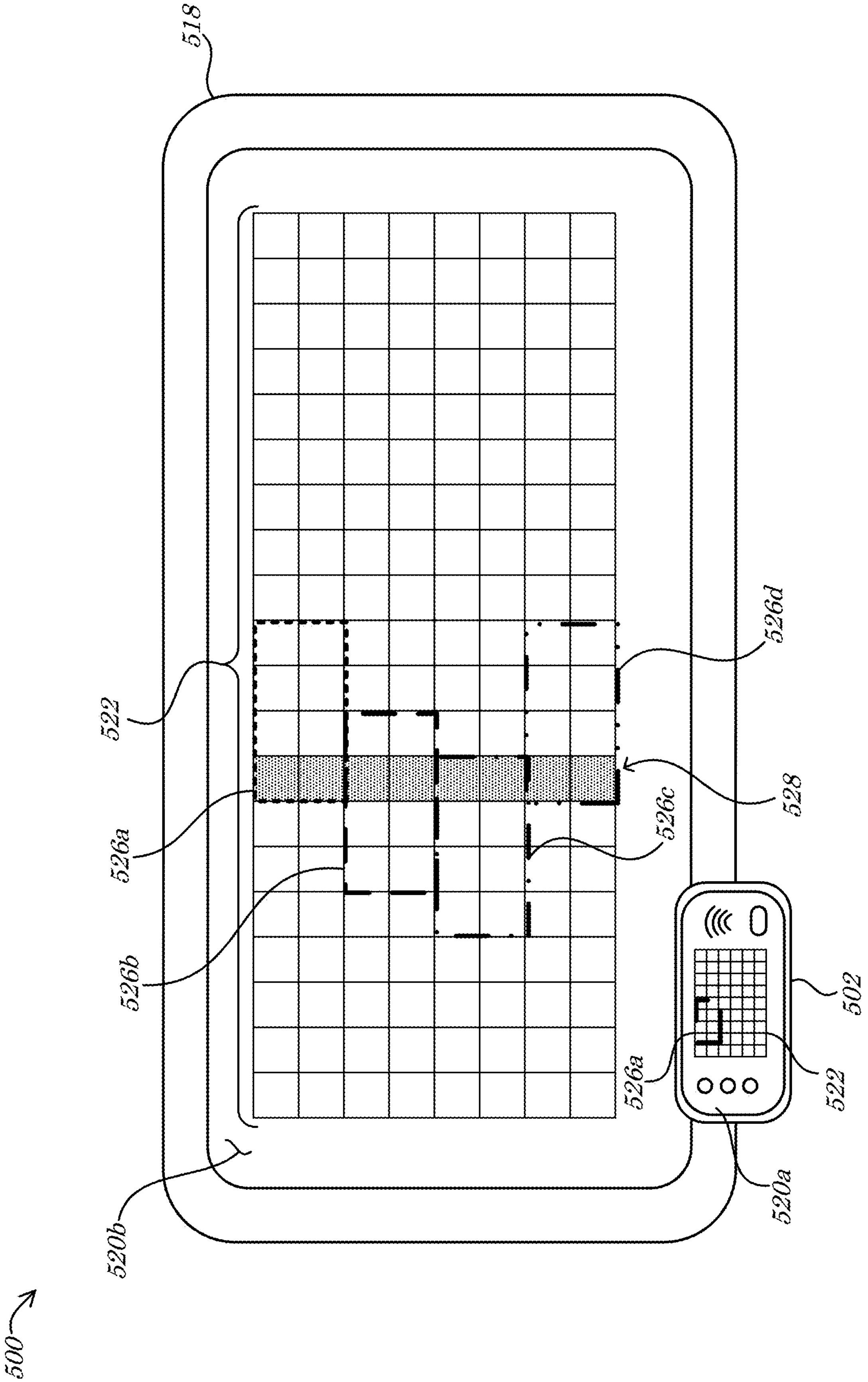

According to some embodiments, and with particular reference to FIG. 5B, one or more player fields 526*a*-*d* may be defined and/or positioned on the community gaming field 522 in one or more manners that cooperatively affect game play of the slot-style game. As depicted in FIG. 5B, for example, a first player field 526*a* may be defined and/or positioned by the player device 502 (e.g., operated by a first player), a second player field 526*b* may be defined and/or positioned (e.g., by a second player; not shown) adjacent to the first player field 526*a*, a third player field 526*c* may be defined and/or positioned (e.g., by a third player; not shown) adjacent to the second player field 526*b*, and/or a fourth player field 526*d* may be defined and/or positioned (e.g., by a fourth player; not shown) adjacent to the third player field 526*c*. In some embodiments, the condition of adjacency of the player fields 526*a*-*d* may comprise a cumulative and/or commutative property that defines a particular condition within the slot-style game. Because the combination of player fields 526*a*-*d* form a continuous span of player fields 526*a*-*d* reaching from a top (or first) extent of the community gaming field 522 to a bottom (or second) extent of the community gaming field 522, for example, population of all or part of the community gaming field 522 (e.g., just the player fields 526*a*-*d*) may be conducted in a different manner than it otherwise would (e.g., in accordance with a second manner of population where a first manner of population would otherwise be utilized by the community gaming device 518).

In some embodiments, the continuous span of player fields 526*a*-*d* may define one or more sets of individual gaming positions (not separately labeled) of the community gaming field 522, thereby defining a joint player field 528. The joint player field 528 may comprise, for example, an entire column of the community gaming field 522 that represents the continual top-to-bottom span of the player fields 526*a*-*d*. According to some embodiments, the definition of the joint player field 528 may cause the community gaming device 518 to apply a more favorable paytable, symbol set, higher wager options, etc. to the individual gaming positions within the joint player field 528, thereby providing enhanced benefits to the group of players that have managed to coordinate the positioning (and/or sizing) of their player fields 526*a*-*d* to achieve the top-to-bottom span condition. While the top-to-bottom span condition is depicted for purposes of non-limiting example in FIG. 5B, other conditions and/or relations between and/or resulting from player field 526*a*-*d* placement may also or alternatively affect game play in accordance with some embodiments.

Figure 5C:
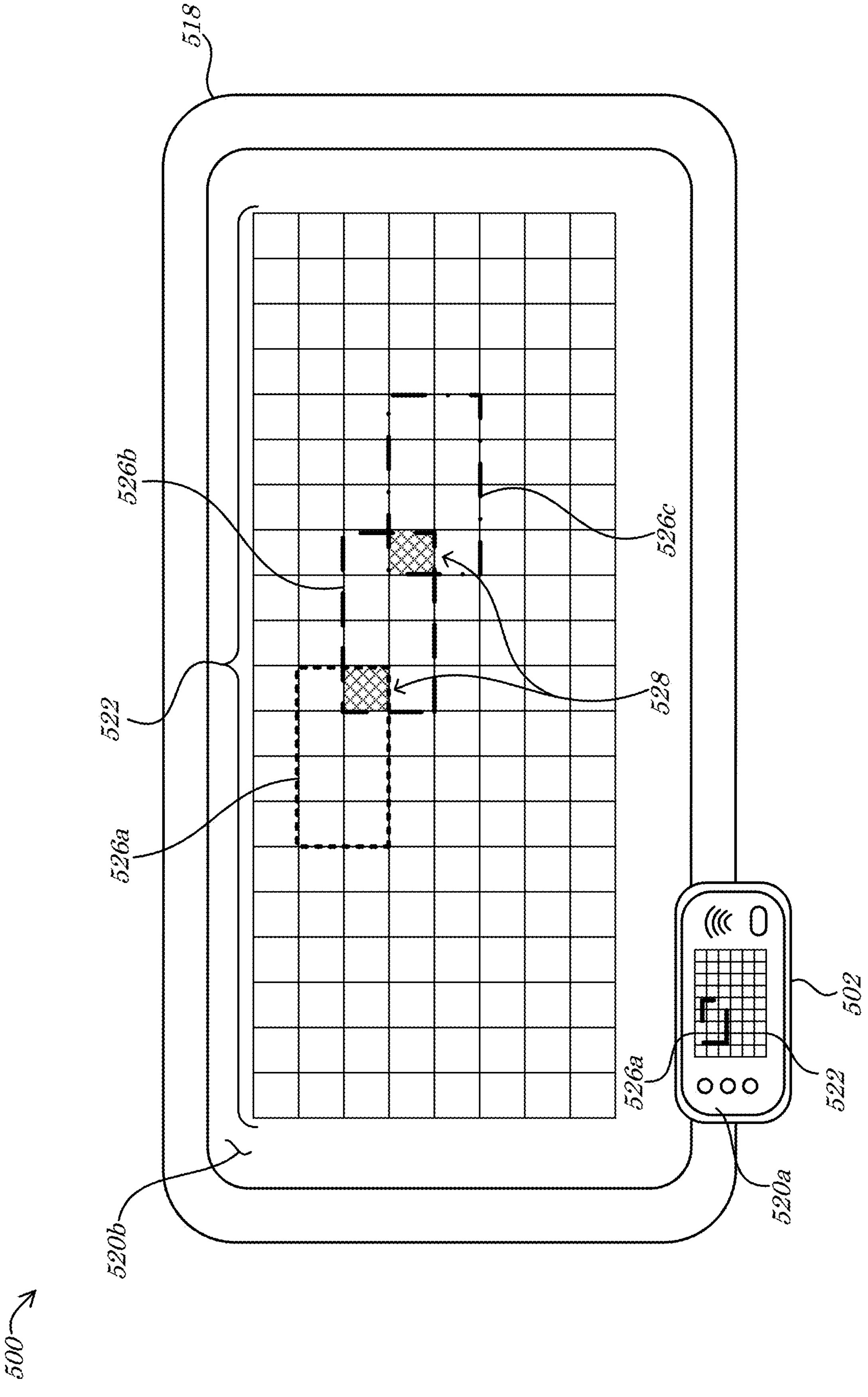

According to some embodiments, and with particular reference to FIG. 5C, one or more of the player fields 526*a*-*c* may be defined and/or positioned on the community gaming field 522 in one or more manners that impose barriers that affect game play of the slot-style game. As depicted in FIG. 5C, for example, the first player field 526*a* may be defined and/or positioned by the player device 502 (e.g., operated by the first player), the second player field 526*b* may be defined and/or positioned (e.g., by the second player) overlapping with the first player field 526*a*, and/or the third player field 526*c* may be defined and/or positioned (e.g., by the third player) overlapping with the second player field 526*c*. Each of the overlapping areas of the player fields 526*a*-*c* may define, in some embodiments, different joint player fields 528. According to some embodiments, as described herein, such joint player fields 528 may provide benefits to each player associated with the overlap, thereby incentivizing players to coordinate their placements of their player fields 526*a*-*c*. In some embodiments, the joint player fields 528 may instead provide for negative (or strategically useful) results. The joint player fields 528 in FIG. 5C, for example, may be defined (e.g., based on rules or randomly) as barriers, holes, and/or dead zones. Such barriers may, for example, define the joint player fields 528 as individual gaming positions that can no longer be utilized (e.g., upon resolution of a current round and/or with respect to additional rounds of the slot-style game). Such joint player fields 528 acting as barriers or dead zones may limit the placement of subsequent player fields 526*a-c*. No player field 526*a-c* may be permitted, for example, to include such a barrier joint player field 528 within the bounds thereof. In such a manner, for example, overlapping player fields 526*a-c* may limit the number of gaming positions available for play and thereby increase the chances of subsequent overlapping events. In some embodiments, the overlapping may be utilized by team players in an attempt to thwart another team. The joint player fields 528 may, for example, be assigned to a particular team or group and blocked out from use only by one or more other teams or groups. Teams may accordingly compete to "own" different areas of the community gaming field 522 by, e.g., converting respective joint player fields 528 to their particular team color, symbol, logo, etc. According to some embodiments, the joint player fields 528 may be utilized by the system by incorporation into the mathematical vector motion and/or physics model for swipe movement of player fields 526*a-c*. Such joint player field 528 barriers may, for example, act as virtual bumpers such as in a bumper pool game, thereby increasing the number of objects that may deflect a moving player field 526*a-c* (e.g., an accordingly decreasing the likelihood that a player will be able to utilize vector motion to have their respective joint player field 528 arrive in a desired location).

Figure 5D:
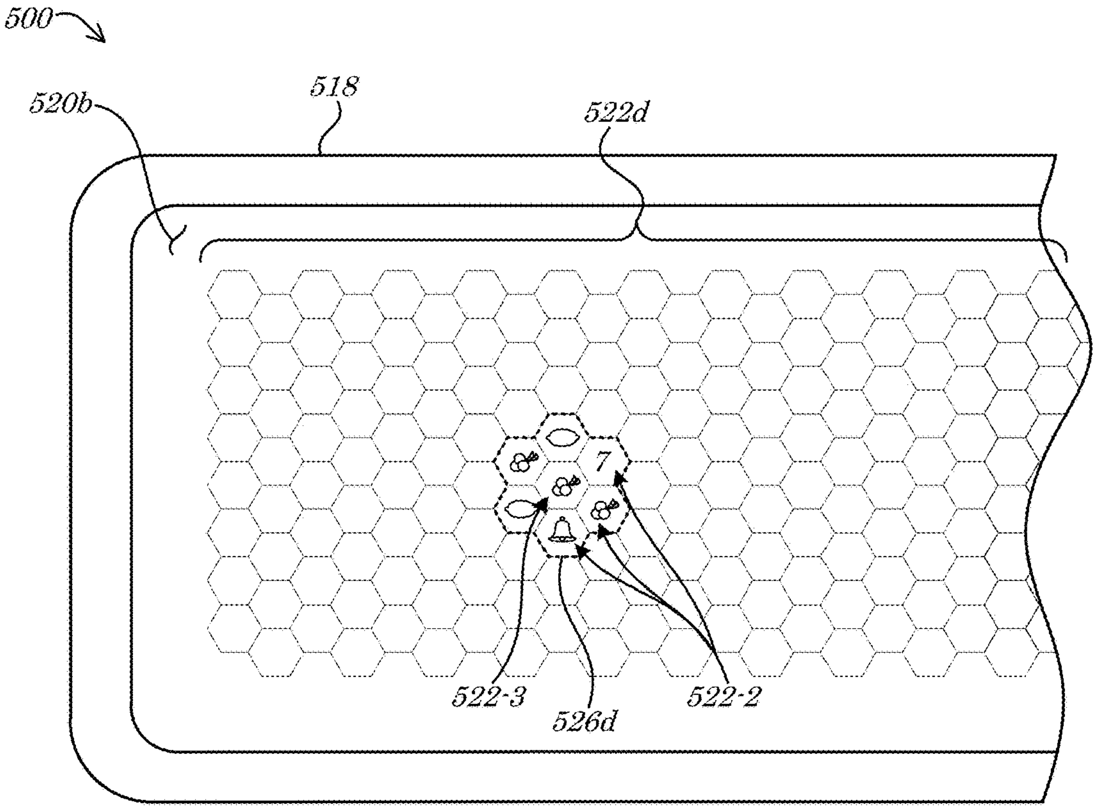
Figure 5E:
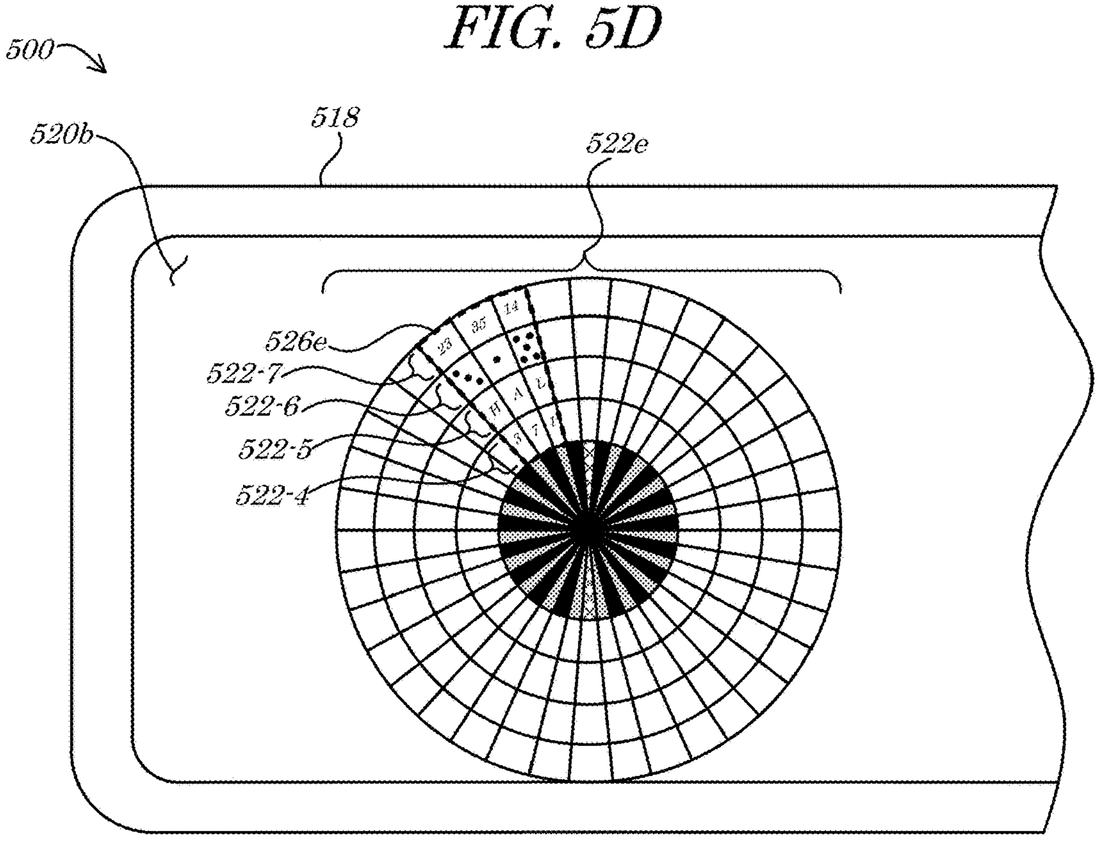

In some embodiments, and with particular reference to FIG. 5D and FIG. 5E, the configuration of a community gaming field 522*d-e* may take various forms. With respect to FIG. 5D, for example, a hexagonal community gaming field 522*d* may comprise and/or define a field or matrix comprising a plurality of hexagonal gaming positions (e.g., "hexes"; not separately labeled). Varying the shape of the gaming positions may allow for more varied and intriguing game play options. In the example utilizing the hexes in FIG. 5D, for example, a hexagonal player field 526*d* may comprise seven exterior gaming position hexes 522-2 and a single internal or bounded gaming position hex 522-3. In some embodiments (as shown), the hexes of the hexagonal player field 526*d* may be populated with slot-style symbols in accordance with slot-style game play processes as described herein. According to some embodiments, the bounded gaming position hex 522-3 may receive special (or different treatment) from the exterior gaming position hexes 522-2 of the hexagonal player field 526*d*. The bounded gaming position hex 522-3 may be prevented from being overlapped by another players field (not shown), for example, may comprise or define a wild symbol, and/or may define a blocking or dead space symbol (e.g., a symbol blocked from use with respect to one or more players).

According to some embodiments, a circular community gaming field 522*e* may comprise a circular, radial, and/or other non-linear arrangement of gaming positions such as may resemble a roulette wheel, as depicted in FIG. 5E. The circular community gaming field 522*e* of FIG. 5E may, for example, permit and/or lend itself to additional relational interpretations between or amongst the gaming positions that are not possible or desirable with respect to rectilinear fields or matrices. In the circular community gaming field 522*e* of FIG. 5E, for example, a pie-shaped player field 526*e* may comprise different tiers or levels of gaming positions with respect to the center of the circular community gaming field 522*e*. According to some embodiments, the pie-shaped player field 526*e* may comprise a first or inner tier of gaming positions 522-4, a second tier of gaming positions 522-5, a third tier of gaming positions 522-6, and/or an outer or fourth tier of gaming positions 522-7. In some embodiments, each tier of gaming positions 522-4, 522-5, 522-6, 522-7 may be separately populated and/or may be populated with different symbols, numbers, icons, etc. According to some embodiments, each tier of gaming positions 522-4, 522-5, 522-6, 522-7 may be populated by rotation of the entire respective ring of the circular community gaming field 522*e*. Each ring may, for example, rotate in a particular direction and/or with a particular speed that, e.g., differs from an adjacent ring to heighten complexity of the population process. In some embodiments, execution of the slot-style game with a circular community gaming field 522*e* may be further enhanced or altered by incorporating usage of a physical gaming element (not shown in FIG. 5E; e.g., the die 406 of FIG. 4 herein) that that is deposited (e.g., tossed, placed, rolled, cast) on the circular community gaming field 522*e*. In the case that the circular community gaming field 522*e* comprises digital output of the second interface 520*b* that is presented as concentrically spinning tiers of gaming positions 522-4, 522-5, 522-6, 522-7, for example, the physical element may only need to be placed on the second interface 520*b* and the underlying rotation of the tiers of gaming positions 522-4, 522-5, 522-6, 522-7 may stop in accordance with game mechanics (e.g., after a random length of time and/or a certain number of partial rotations) such that the physical element becomes positioned on, over, or in a particular gaming position when the spinning/populations stops. Such an incorporation of the physical element with a spinning and/or circular community gaming field 522*e* may provide the feel of a roulette game to the slot-style game.

In some embodiments, any or all of the components 502, 518, 520*a-b*, 522, 522*d-e*, 522-2, 522-3, 522-4, 522-5, 522-6, 522-7, 526*a-e*, 528 of the system 500 may be similar in configuration and/or functionality to any similarly named and/or numbered components described herein. Fewer or more components 502, 518, 520*a-b*, 522, 522*d-e*, 522-2, 522-3, 522-4, 522-5, 522-6, 522-7, 526*a-e*, 528 (and/or portions thereof) and/or various configurations of the components 502, 518, 520*a-b*, 522, 522*d-e*, 522-2, 522-3, 522-4, 522-5, 522-6, 522-7, 526*a-e*, 528 may be included in the system 500 without deviating from the scope of embodiments described herein. While multiple instances of some components 520*a-b*, 522, 522*d-e*, 522-2, 522-3, 522-4, 522-5, 522-6, 522-7, 526*a-e*, 528 are depicted and while single instances of other components 502, 518 are depicted, for example, any component 502, 518, 520*a-b*, 522, 522*d-e*, 522-2, 522-3, 522-4, 522-5, 522-6, 522-7, 526*a-e*, 528 depicted in the system 500 may comprise a single device, a combination of devices and/or components 502, 518, 520*a-b*, 522, 522*d-e*, 522-2, 522-3, 522-4, 522-5, 522-6, 522-7, 526*a-e*, 528, and/or a plurality of devices, as is or becomes desirable and/or practicable. Similarly, in some embodiments, one or more of the various components 502, 518, 520*a-b*, 522, 522*d-e*, 522-2, 522-3, 522-4, 522-5, 522-6, 522-7, 526*a-e*, 528 may not be needed and/or desired in the system 500.

VI. Community Slot-Style Gaming Apparatus and Articles of Manufacture

Figure 6:
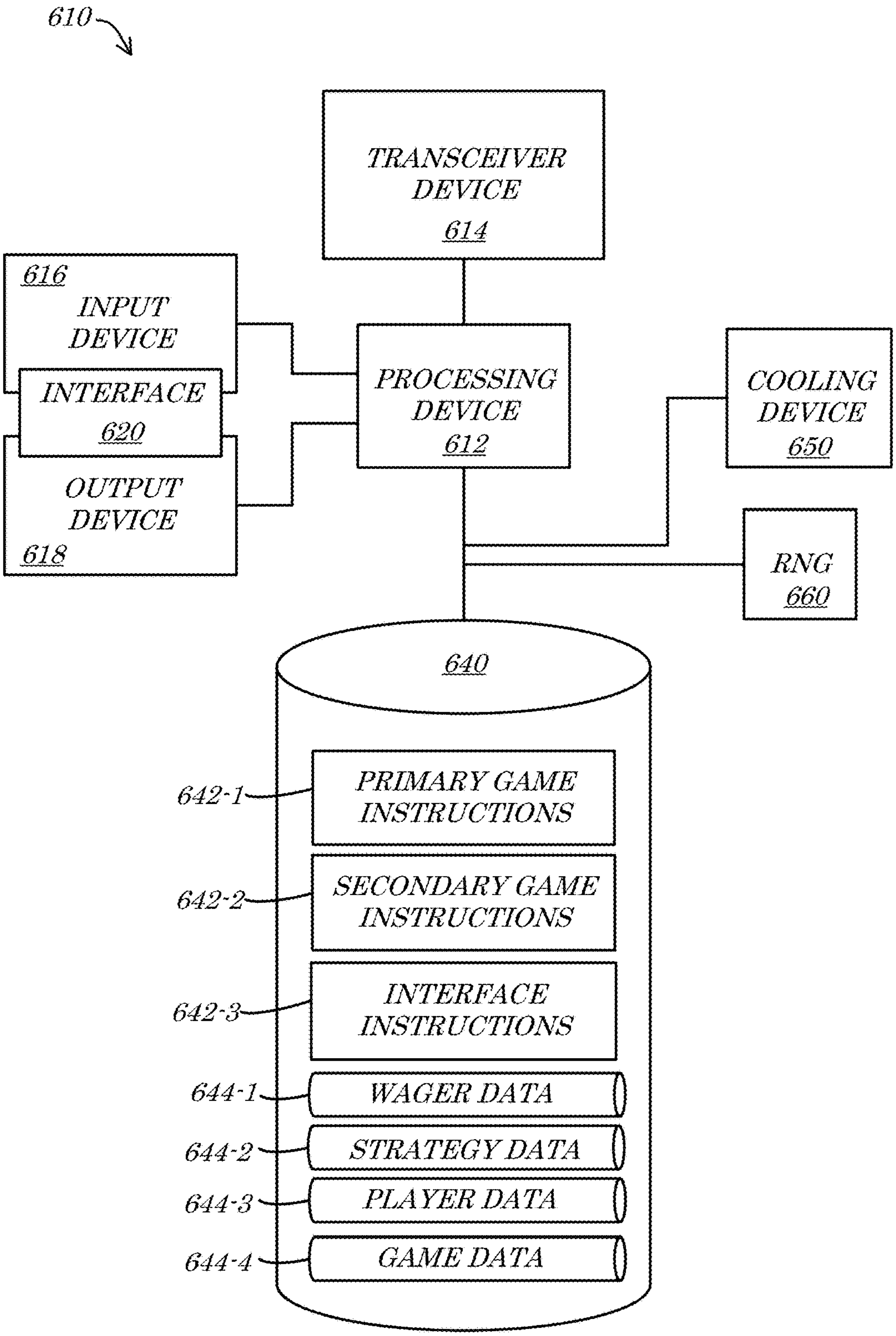
FIG. 6 is a block diagram of an apparatus according to some embodiments.
Figure 7A:
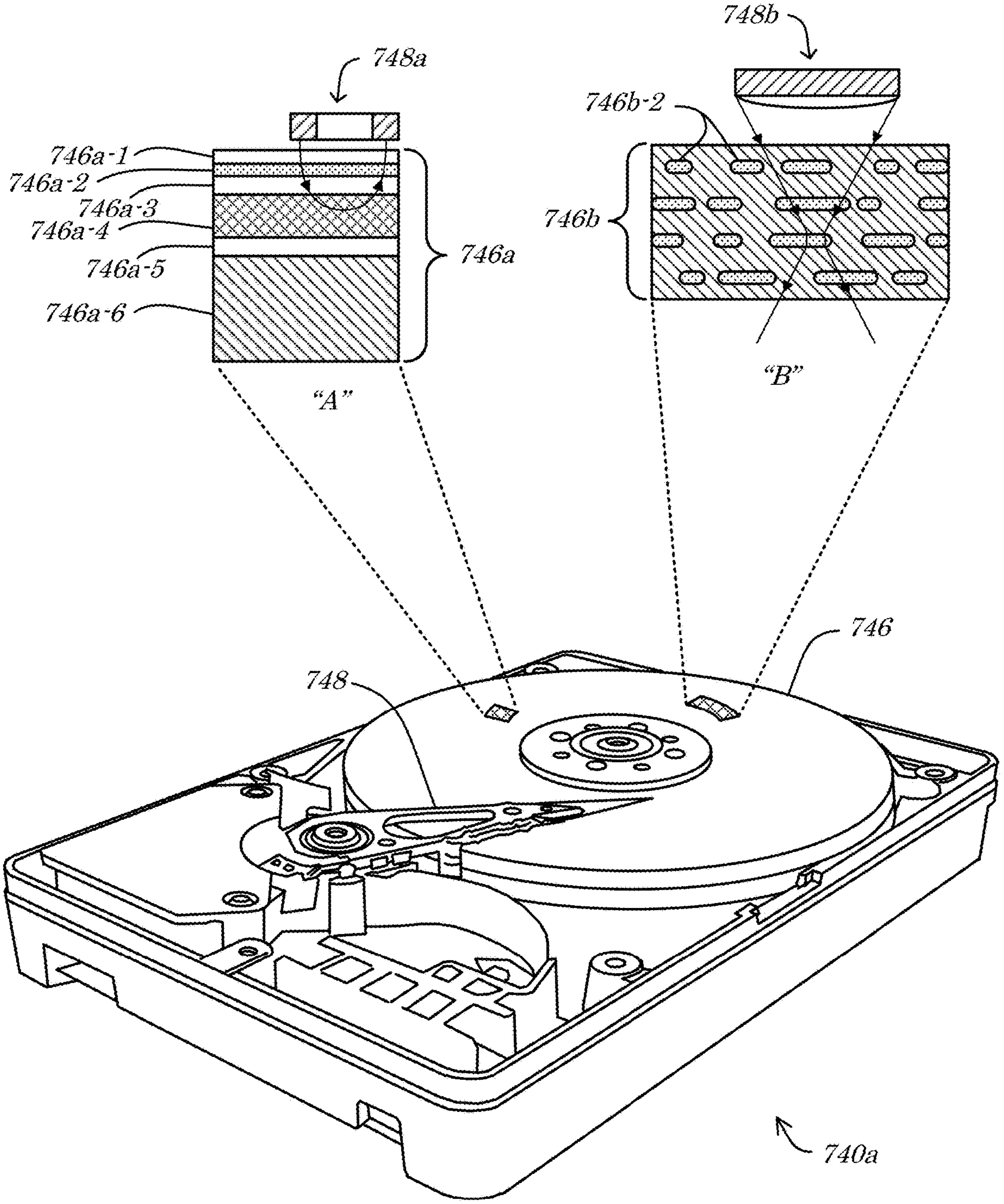
FIG. 7A, FIG. 7B, FIG. 7C, FIG. 7D, and FIG. 7E are perspective diagrams of exemplary data storage devices according to some embodiments.
Figure 7B:
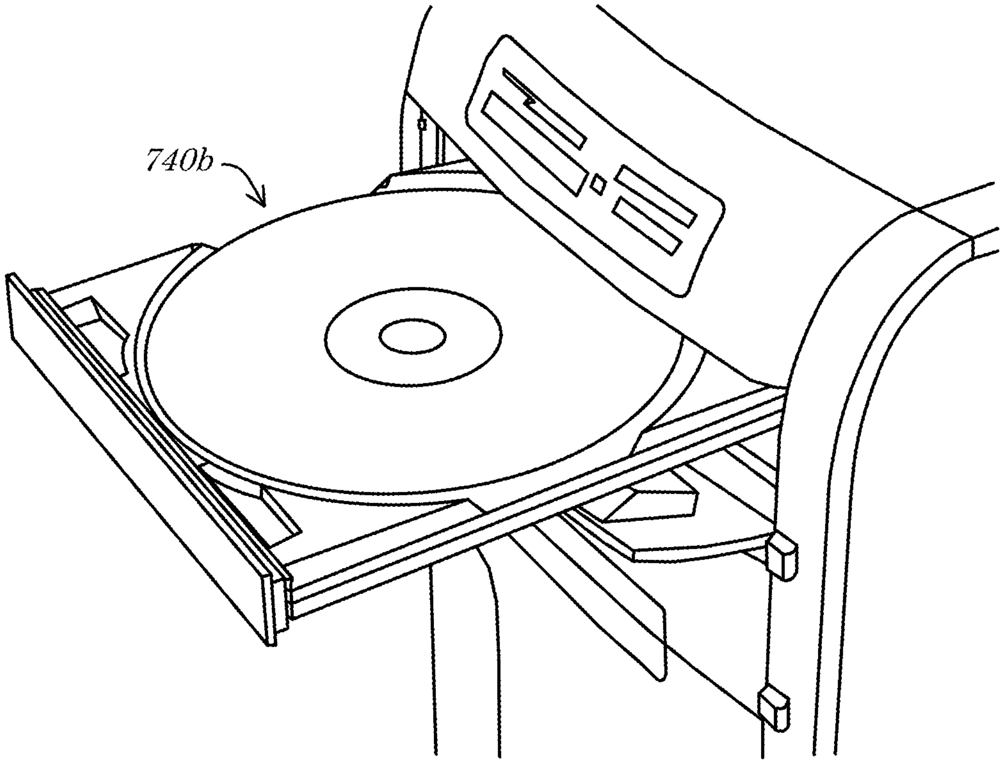
Figure 7C:
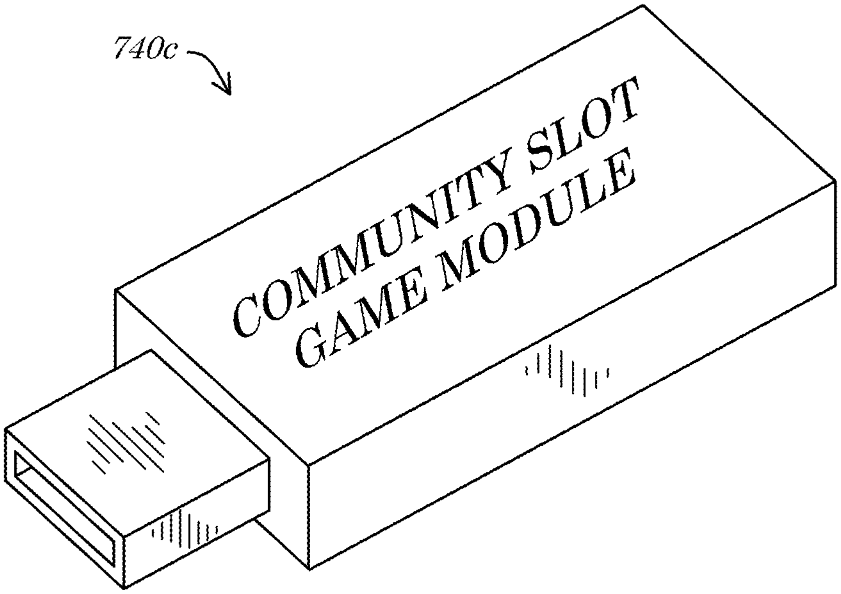
Figure 7D:
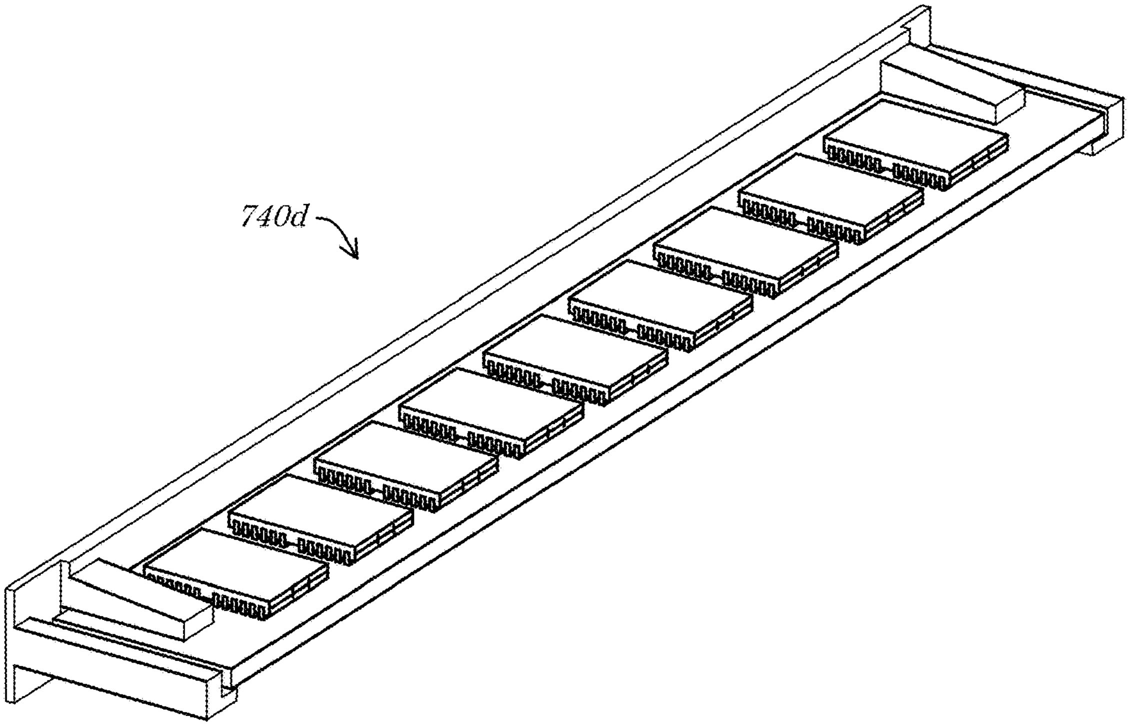
Figure 7E:
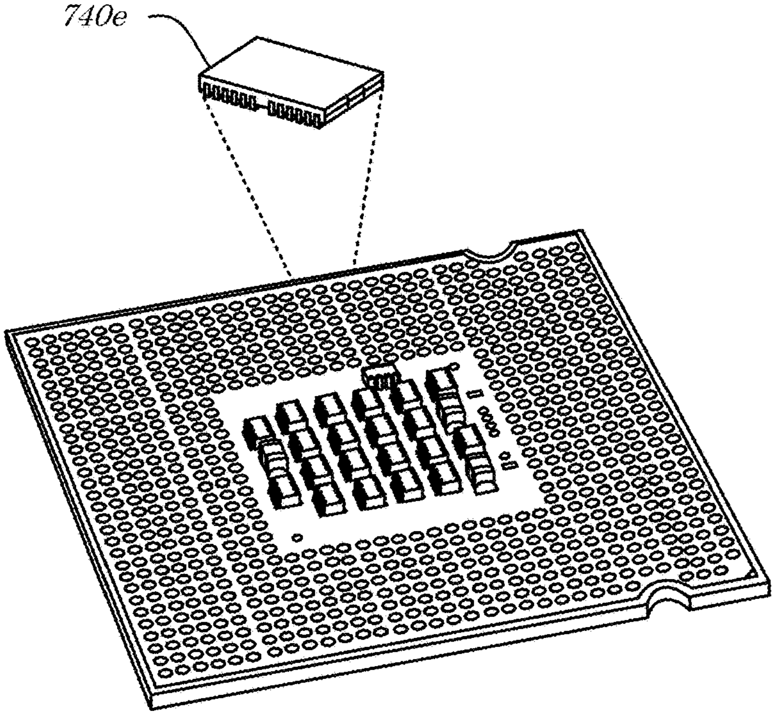

Referring now to FIG. 6, a block diagram of an apparatus 610 according to some embodiments is shown. In some embodiments, the apparatus 610 may be similar in configuration and/or functionality to any of the player and/or user devices 102*a-n*, 202*a-c*, 502 and/or the servers and/or controller devices 110, 210 of FIG. 1, FIG. 2, and/or FIG. 5 herein, and/or may otherwise comprise a portion of the systems 100, 200, 400, 500 and/or the method 300 of FIG.

1, FIG. 2, FIG. 3, FIG. 4, FIG. 5A, FIG. 5B, FIG. 5C, FIG. 5D, and/or FIG. 5E herein. The apparatus 610 may, for example, execute, process, facilitate, and/or otherwise be associated with the method 300 of FIG. 3 herein, and/or one or more portions and/or combinations thereof. In some embodiments, the apparatus 610 may comprise a processing device 612, a transceiver device 614, an input device 616, an output device 618, an interface 620, a memory device 640 (storing various programs and/or instructions 642 and data 644), a cooling device 650, and/or an RNG 660. According to some embodiments, any or all of the components 612, 614, 616, 618, 620, 640, 642, 644, 650, 660 of the apparatus 610 may be similar in configuration and/or functionality to any similarly named and/or numbered components described herein. Fewer or more components 612, 614, 616, 618, 620, 640, 642, 644, 650, 660 and/or various configurations of the components 612, 614, 616, 618, 620, 640, 642, 644, 650, 660 be included in the apparatus 610 without deviating from the scope of embodiments described herein.

According to some embodiments, the processing device 612 may be or include any type, quantity, and/or configuration of electronic and/or computerized processor that is or becomes known. The processing device 612 may comprise, for example, an Intel® IXP 2800 network processor or an Intel® XEON™ Processor unit coupled with an Intel® E7501 chipset. In some embodiments, the processing device 612 may comprise multiple inter-connected units, processors, microprocessors, and/or micro-engines. According to some embodiments, the processing device 612 (and/or the apparatus 610 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server, necessary power may be supplied via a standard AC outlet, power strip, surge protector, a PDU, and/or Uninterruptible Power Supply (UPS) device.

In some embodiments, the input device 616 and/or the output device 618 are communicatively coupled to the processing device 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by a player, such as to place a wager in a community slot-style game as described herein). In some embodiments, the input device 616 may comprise a sensor configured to provide information such as player input (e.g., player wager definitions and/or data transmitted or retrieved from a physical gaming element) to the apparatus 610 and/or the processing device 612. The output device 618 may, according to some embodiments, comprise a display screen and/or other practicable output component and/or device. The output device 618 may, for example, provide the interface 620 to a player (e.g., via a website, electronic communications network device, and/or local software application; e.g., the gaming interfaces 220*a-d*, 420, 520*a-b* of FIG. 2, FIG. 4, FIG. 5A, FIG. 5B, FIG. 5C, FIG. 5D, and/or FIG. 5E, herein). According to some embodiments, the input device 616 and/or the output device 618 may comprise and/or be embodied in a single device such as a touch-screen monitor (e.g., a device capable of both receiving input and providing output; e.g., via the interface 620).

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. In some embodiments, the transceiver device 614 may be coupled to provide data to a remote and/or wireless device (not shown in FIG. 6), such as in the case that the apparatus 610 is utilized to provide the interface 620 to a wireless and/or mobile player device, as described herein. The transceiver device 614 may, for example, comprise a cellular telephone network transmission device that receives (and/or sends) signals indicative of game interface components to a player handheld, mobile, and/or telephone device, e.g., from a remote server device or from a dedicated or stand-alone gaming device. According to some embodiments, the transceiver device 614 may also or alternatively be coupled to the processing device 612. In some embodiments, the transceiver device 614 may comprise an IR, RF, Bluetooth™, NFC, and/or Wi-Fi® network device coupled to facilitate communications between the processing device 612 and another device (such as a player and/or third-party device, not shown).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of primary game instructions 642-1, secondary (e.g., bonus) game instructions 642-2, interface instructions 642-3, player data 644-1, wager data 644-2, strategy data 644-3, and/or game data 644-4. In some embodiments, the primary game instructions 642-1, secondary game instructions 642-2, interface instructions 642-3, player data 644-1, wager data 644-2, strategy data 644-3, and/or game status data 644-4 may be utilized by the processing device 612 to provide output information via the output device 618 and/or the transceiver device 614.

According to some embodiments, the primary game instructions 642-1 may be operable to cause the processing device 612 to process player data 644-1, wager data 644-2, strategy data 644-3, and/or game status data 644-4. Player data 644-1, wager data 644-2, strategy data 644-3, and/or game status data 644-4 received via the input device 616 and/or the transceiver device 614 may, for example, be analyzed, sorted, filtered, decoded, decompressed, ranked, scored, plotted, and/or otherwise processed by the processing device 612 in accordance with the primary game instructions 642-1. In some embodiments, player data 644-1, wager data 644-2, strategy data 644-3, and/or game status data 644-4 may be fed by the processing device 612 through one or more mathematical and/or statistical formulas and/or models in accordance with the primary game instructions 642-1 to provide a community slot-style wagering game in accordance with embodiments described herein.

In some embodiments, the secondary game instructions 642-2 may be operable to cause the processing device 612 to process player data 644-1, wager data 644-2, strategy data 644-3, and/or game status data 644-4. Player data 644-1, wager data 644-2, strategy data 644-3, and/or game status data 644-4 received via the input device 616 and/or the transceiver device 614 may, for example, be analyzed, sorted, filtered, decoded, decompressed, ranked, scored, plotted, and/or otherwise processed by the processing device 612 in accordance with the secondary game instructions 642-2. In some embodiments, player data 644-1, wager data 644-2, strategy data 644-3, and/or game status data 644-4 may be fed by the processing device 612 through one or more mathematical and/or statistical formulas and/or models in accordance with the secondary game instructions 642-2 to provide additional or alternate gameplay rules, outcomes, and/or results, such as in addition to a base or primary game (e.g., a primary community slot-style game), such as a secondary group and/or team game driven by outcomes of the primary game (e.g., defined by the symbols and/or outcomes generated to populate a underlying community gaming field) and/or such as may be triggered based on interaction of a physical gaming element with a community gaming device, in accordance with embodiments described herein.

According to some embodiments, the interface instructions 642-3 may be operable to cause the processing device 612 to process player data 644-1, wager data 644-2, strategy data 644-3, and/or game status data 644-4. Player data 644-1, wager data 644-2, strategy data 644-3, and/or game status data 644-4 received via the input device 616 and/or the transceiver device 614 may, for example, be analyzed, sorted, filtered, decoded, decompressed, ranked, scored, plotted, and/or otherwise processed by the processing device 612 in accordance with the interface instructions 642-3. In some embodiments, player data 644-1, wager data 644-2, strategy data 644-3, and/or game status data 644-4 may be fed by the processing device 612 through one or more mathematical and/or statistical formulas and/or models in accordance with the interface instructions 642-3 to provide a community slot-style wagering game field, player field selection mechanisms, wager definition mechanisms, and/or other gameplay functional graphical elements (e.g., graphical displays of a physical gaming element), in accordance with embodiments described herein.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

In some embodiments, the apparatus 610 may comprise the cooling device 650. According to some embodiments, the cooling device 650 may be coupled (physically, thermally, and/or electrically) to the processing device 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

According to some embodiments, the apparatus 610 may comprise the RNG 660. The RNG 660 may comprise, for example, a specially configured device and/or module for generating random (or pseudo random) numbers, e.g., in accordance with applicable regulations pertaining to gambling or wagering activities. The RNG 660 may comprise, for example, a secure and/or tamper resistant (or tamper evident) module that is inspected and/or approved by a regulatory entity for generating random outcomes for online wagering games. In some embodiments, instead of comprising a stand-alone, separate, distinct, and/or peripheral device, object, or module, the processing device 612 may comprise the RNG 660.

Referring now to FIG. 7A, FIG. 7B, FIG. 7C, FIG. 7D, and FIG. 7E, perspective diagrams of exemplary data storage devices 740*a-e* according to some embodiments are shown. The data storage devices 740*a-e* may, for example, be utilized to store instructions and/or data such as the primary game instructions 642-1, secondary game instructions 642-2, interface instructions 642-3, player data 644-1, wager data 644-2, strategy data 644-3, and/or game status data 644-4, each of which is described in reference to FIG. 6 herein. In some embodiments, instructions stored on the data storage devices 740*a-e* may, when executed by a processor, cause the implementation of and/or facilitate the method 300 of FIG. 3 herein, and/or portions thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 748. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-7, and/or a substrate layer 746*a*-6. According to some embodiments, a magnetic read head 746*a* may be coupled and/or disposed to read data from the magnetic data storage layer 746*a*-2.

In some embodiments, the data storage medium 746, depicted as a second data storage medium 746*b* for example (e.g., breakout cross-section "B"), may comprise a plurality of data points 746*b*-2 disposed with the second data storage medium 746*b*. The data points 746*b*-2 may, in some embodiments, be read and/or otherwise interfaced with via a laser-enabled read head 748*b* disposed and/or coupled to direct a laser beam through the second data storage medium 746*b*.

In some embodiments, the second data storage device 740*b* may comprise a CD, CD-ROM, DVD, Blu-Ray™ Disc, and/or other type of optically-encoded disk and/or other storage medium that is or becomes known or practicable. In some embodiments, the third data storage device 740*c* may comprise a USB keyfob, dongle, and/or other type of flash memory data storage device that is or becomes know or practicable. In some embodiments, the fourth data storage device 740*d* may comprise RAM of any type, quantity, and/or configuration that is or becomes practicable and/or desirable. In some embodiments, the fourth data storage device 740*d* may comprise an off-chip cache such as a Level 2 (L2) cache memory device. According to some embodiments, the fifth data storage device 740*e* may comprise an on-chip memory device such as a Level 1 (L1) cache memory device.

The data storage devices 740*a-e* may generally store program instructions, code, and/or modules (e.g., a combination of native instructions and downloaded software instructions) that, when executed by a processing device cause a particular machine to function in accordance with one or more embodiments described herein. The data storage devices 740*a-e* depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an game provider may, for example, comprise various specialized computers that interact to provide for community slot-style games as described herein.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

VII. Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and any-thing which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

"Computing" may comprise any action performed by a computer and/or computer processing device such as a CPU. Computing may include, for example, accessing a data store to lookup or retrieve data, processing an electronic signal, rendering a graphical image on an output device, calculating one or more variable values, resolving a mathematical model or formula, etc.

A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. § 101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Embodiments of the present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A community slot-style gaming system for executing a community slot-style game, comprising:

a processing device;

a communal display screen in communication with the processing device;

an RNG device in communication with the processing device; and a non-transitory memory device in communication with the processing device, the memory device storing community slot-style gameplay instructions that when executed by the processing device result in:

outputting, via the communal display screen, a community gaming field comprising a plurality of individual gaming positions;

receiving, from a first player input device of a first player, a first definition of a first player field, the first player field comprising a first subset of the plurality of individual gaming positions, and the first definition comprising a definition of a first size of the first player field and a definition of a first location of the player field within the community gaming field, wherein the definition of the first location of the player field within the community gaming field comprises a motion-vector input defined by first input of the first player into a first interface of the first player input device;

receiving, from a second player input device of a second player, a second definition of a second player field, the second player field comprising a second subset of the plurality of individual gaming positions, and the second definition comprising a definition of a second size of the second player field and a definition of a second location of the second player field within the community gaming field;

populating, utilizing data generated by the RNG, each of the individual gaming positions of the community gaming field that correspond to the first and second subsets of the plurality of individual gaming positions for the first and second player fields;

evaluating, for each of the first and second player fields, and based on the population of the individual gaming positions within each of the first and second player fields, an outcome for each of the first and second player fields;

computing, based on the outcomes for the first and second player fields, at least one result for the slot-style game; and outputting, via the communal display screen, an indication of the computed at least one result for the slot-style game.

2. The community slot-style gaming system of claim 1, wherein the community slot-style gameplay instructions, when executed by the processing device, further result in:

identifying a physical gaming element disposed on the communal display screen; and identifying data descriptive of the physical gaming element.

3. The community slot-style gaming system of claim 2, wherein at least one of the populating and the evaluating is based on the data descriptive of the physical gaming element.

4. The community slot-style gaming system of claim 3, wherein the data descriptive of the physical gaming element comprises an identification of a particular individual gaming position upon which the physical gaming element is disposed and wherein the populating of the particular individual gaming position is based on the presence of the physical gaming element disposed on the particular individual gaming position.

5. The community slot-style gaming system of claim 3, wherein the data descriptive of the physical gaming element comprises an identification of a particular player field within which the physical gaming element is disposed and wherein the evaluating of the particular player field is based on the presence of the physical gaming element disposed within the particular player field.

6. The community slot-style gaming system of claim 2, wherein the identifying of the data descriptive of the physical gaming element comprises receiving data wirelessly from the physical gaming element.

7. The community slot-style gaming system of claim 2, wherein the data descriptive of the physical gaming element comprises data descriptive of a game play indicia assigned to a particular facet of the physical gaming element.

8. The community slot-style gaming system of claim 1, wherein the community slot-style gameplay instructions, when executed by the processing device, further result in:

identifying individual gaming positions that are common to each of the first and second player fields; and evaluating, based on the individual gaming positions that are common to each of the first and second player fields, at least one joint outcome.

9. The community slot-style gaming system of claim 8, wherein the computing of the at least one result for the slot-style game is based at least in part on the at least one joint outcome.

10. The community slot-style gaming system of claim 1, wherein the first definition of the first size of the first player field comprises a first selection of a first predetermined size that is assigned to a first particular wager amount.

11. The community slot-style gaming system of claim 10, wherein the second definition of the second size of the second player field comprises a second selection of a second predetermined size that is assigned to a second particular wager amount.

12. The community slot-style gaming system of claim 1, wherein the first definition of the first position of the first player field within the community gaming field comprises a first selection of a first predetermined avatar that is assigned to the first particular position within the community gaming field.

13. The community slot-style gaming system of claim 12, wherein the second definition of the second position of the second player field within the community gaming field comprises a second selection of a second predetermined avatar that is assigned to the second particular position within the community gaming field.

14. The community slot-style gaming system of claim 1, wherein the second definition of the second position of the second player field within the community gaming field comprises an indication of a second motion-vector input defined by second input of the second player into a second interface of the second player input device.

15. The community slot-style gaming system of claim 1, wherein the first definition of the first size of the first player field and the first definition of the first position of the first player field within the community gaming field comprises a plurality of selections of a plurality of non-adjacent individual gaming positions.

16. The community slot-style gaming system of claim 1, wherein the community slot-style gameplay instructions, when executed by the processing device, further result in:

identifying one or more individual gaming positions that are common to the first and second player fields.

17. The community slot-style gaming system of claim 16, wherein the community slot-style gameplay instructions, when executed by the processing device, further result in:

preventing the one or more individual gaming positions that are common to the first and second player fields from being utilized in the evaluation.

18. The community slot-style gaming system of claim 16, wherein the populating, evaluating, computing, and outputting are conducted for a first spin of the community slot-style game and wherein the community slot-style gameplay instructions, when executed by the processing device for a second spin of the community slot-style game, further result in:

preventing the one or more individual gaming positions that are common to the first and second player fields from being selected by one or more players for inclusion in one or more respective player fields for the second spin of the community slot-style game.

19. The community slot-style gaming system of claim 18, wherein the one or more players prevented from including the one or more individual gaming positions that are common to the first and second player fields in their one or more respective player fields for the second spin of the community slot-style game comprise players that are on a different team than the first and second players.

* * * * *